US011810036B2

(12) United States Patent
Tezak et al.

(10) Patent No.: US 11,810,036 B2
(45) Date of Patent: Nov. 7, 2023

(54) CREATING AND MANAGING STATEMENTS OF WORK

(71) Applicants: Jacob Tezak, Austin, TX (US); Basel Shehadeh, Milwaukee, MI (US); Joshua Karlovich, Canonsburg, PA (US)

(72) Inventors: Jacob Tezak, Austin, TX (US); Basel Shehadeh, Milwaukee, MI (US); Joshua Karlovich, Canonsburg, PA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/737,307

(22) Filed: Jan. 8, 2020

(65) Prior Publication Data

US 2021/0209535 A1     Jul. 8, 2021

(51) Int. Cl.
*G06Q 10/0631* (2023.01)
*G06F 3/0482* (2013.01)

(52) U.S. Cl.
CPC ..... *G06Q 10/06315* (2013.01); *G06F 3/0482* (2013.01); *G06Q 10/06316* (2013.01)

(58) Field of Classification Search
CPC ........ G06Q 10/06315; G06Q 10/06316; G06F 3/0482
USPC ...................................... 705/7.23
See application file for complete search history.

(56) References Cited

U.S. PATENT DOCUMENTS

| 6,154,753 A | 11/2000 | McFarland |
| 10,810,361 B1 | 10/2020 | Venkatraman |
| 2002/0116210 A1 | 8/2002 | Medina |
| 2003/0033167 A1* | 2/2003 | Arroyo .................. G06Q 10/10 705/301 |

(Continued)

FOREIGN PATENT DOCUMENTS

WO    WO-2006086690 A2 *  8/2006    ............. G06Q 10/10

OTHER PUBLICATIONS

Wheatcraft, Communicating Requirements—Effectively!, Jul. 12, 2018, https://www.researchgate.net/profile/Louis-Wheatcraft/publication/327072587_Communicating_Requirements_-_Effectively/links/5b7ea60692851c1e122a315c/Communicating-Requirements-Effectively.pdf, p. 1-17.*

(Continued)

*Primary Examiner* — Mehmet Yesildag
*Assistant Examiner* — James Webb
(74) *Attorney, Agent, or Firm* — Hickman Becker Bingham Ledesma LLP

(57) ABSTRACT

A SOW management system provides centralized management of SOWs during the entire SOW life cycle, from creation through final approval. The SOW management system includes a search tool that allows users to easily retrieve and manage existing SOWs, and SOW template management functionality that allows users to manage different types of SOW templates that are used to create SOWs. The SOW management system also provides user management, including managing user roles, and tracks changes in SOWs throughout the SOW life cycle. This allows users to create and collaborate on SOWs using a centralized system, instead of the conventional approach of manually tracking changes via email. The SOW management system includes (Continued)

the capability to integrate data from third-party systems and to export data to those systems.

19 Claims, 27 Drawing Sheets

(56) References Cited

U.S. PATENT DOCUMENTS

| | | | |
|---|---|---|---|
| 2007/0226267 A1* | 9/2007 | Haagenson | G06Q 10/10 |
| 2009/0282006 A1 | 11/2009 | Misvaer | |
| 2011/0289161 A1* | 11/2011 | Rankin, Jr. | G06Q 10/107 |
| | | | 709/206 |
| 2012/0209803 A1* | 8/2012 | Napierala, II | G06F 16/93 |
| | | | 707/608 |
| 2013/0013529 A1* | 1/2013 | Chheda | G06Q 40/02 |
| | | | 705/342 |
| 2014/0059415 A1* | 2/2014 | Bailey | G06Q 10/06 |
| | | | 715/224 |
| 2014/0303922 A1* | 10/2014 | Manfredi | G06F 11/3072 |
| | | | 702/85 |
| 2014/0304836 A1 | 10/2014 | Velamoor | |
| 2016/0104092 A1* | 4/2016 | Brunswick | G06Q 10/06393 |
| | | | 705/7.39 |
| 2016/0308966 A1 | 10/2016 | Zhang et al. | |
| 2017/0250816 A1 | 8/2017 | Popa | |
| 2018/0239959 A1 | 8/2018 | Bui | |
| 2019/0050587 A1 | 2/2019 | Dang | |
| 2020/0293539 A1 | 9/2020 | Yamada | |
| 2021/0209556 A1 | 7/2021 | Tezak | |

OTHER PUBLICATIONS

DocuSign, DocuSign User Guide, May 8, 2018, https://connect.ncdot.gov/business/Transit/Documents/DocuSign%20User%20Guide.pdf, p. 400-450.*

Tezak, U.S. Appl. No. 16/737,320, filed Jan. 8, 2020, Non-Final Rejection, dated Aug. 20, 2021.

Tezak, U.S. Appl. No. 16/737,320, filed Jan. 8, 2020, Final Rejection, dated Dec. 3, 2021.

* cited by examiner

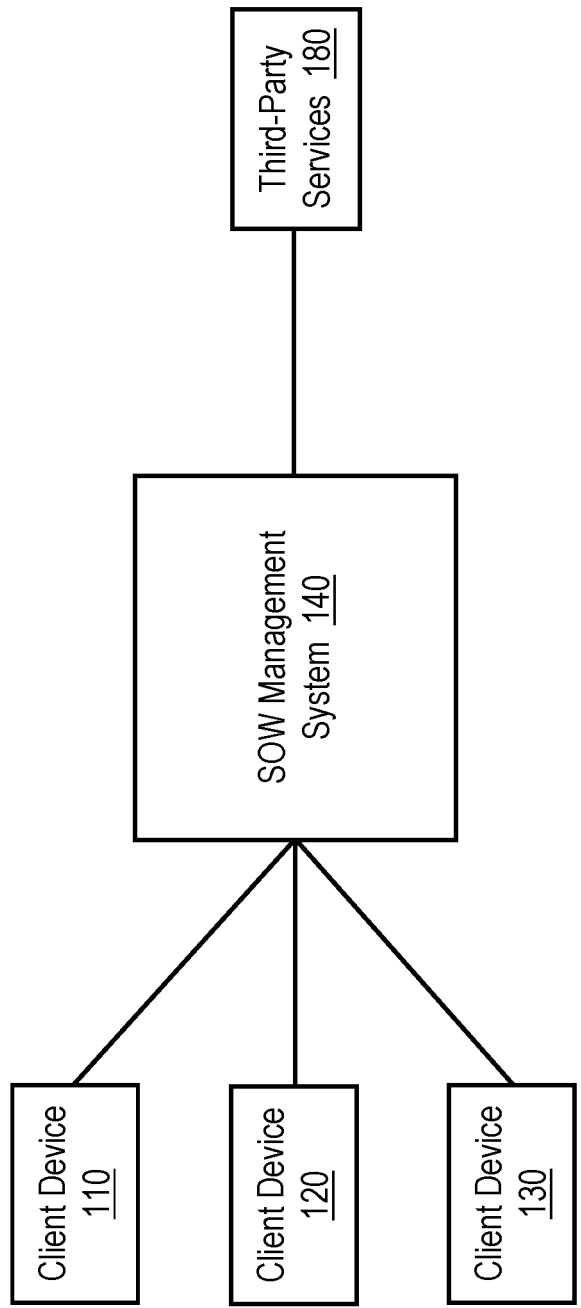

FIG. 1C

| User ID | User Name | Job Title | Roles | Manager Name | Logical Group | Contact Information |
|---------|-----------|-----------|-------|--------------|---------------|---------------------|
| | | | | | User Data 162 | |
| User1 | David Allison | Engineer | SOW Submitter | Allison Beniger | Engineering | DAllison@ab.com |
| User2 | Mark Wilson | Marketing Mgr | SOW Submitter, SOW Approver | John Albert | Pluto Project | MWilson@ab.com |
| User3 | Audrey Mott | Vice President | SOW Template Manager, SOW Administrator | Carson Tolbert | AB Corp | AMott@ab.com |

FIG. 1D

| SOW Template ID | SOW Template Name | Description | Logical Group | Type | Creator | Role | SOW Template Data 164 |
|---|---|---|---|---|---|---|---|
| ST1487 | Advanced Digital Imaging | Descr1 | Pluto Project | SOW | User1 | SOW Template Manager | |
| ST1489 | Cloud Storage | Descr2 | Saturn Division | SOW | User2 | SOW Template Manager | |
| ST1489 | Network Project | Descr3 | Mercury | SOW | User3 | None | |
| ST2945 | Laser Inspection | Descr4 | Mars | SOW | User4 | SOW Template Manager | |

FIG. 1E

| SOW ID | SOW Name | Description | Logical Group | Type | Owner | Status | Notes | Documents | SOW Data 166 Required Approval Role |
|---|---|---|---|---|---|---|---|---|---|
| S5A32 | Advanced Digital Imaging | Descr1 | Pluto Project | SOW | User1 | Submitted | Note1 | Doc1 | SOW Approver |
| S5M05 | AI Marketing | Descr2 | Marketing | SOW | User2 | Reviewed | Note2 Note3 | Doc2 Doc3 | SOW Approver - Level 2 |
| S5L74 | Laser Imaging | Descr3 | Engineering | SOW | User3 | Pending | Note4 Note5 | Doc4 | SOW Approver - Level 1 |

FIG. 2C

SOW Management Screen 200

User 1 ▼

| Home | SOW Approval | Reports | User Directory | Manage ▼ |

Advanced Search Window 220

SOW Name: [      ]   SOW Owner: [User 1] ▶

Type: [-- All --] ▶   Description: [      ]

Status: [Pending] ▶

[Reset Search]   [Search]

Statements of Work (SOWs) Window 230

SOW Management Screen 200

User 1

Home | SOW Approval | Reports | User Directory | Manage▶

202

Advanced Search Window 220

SOW Name [ ]         SOW Owner [User 1]

Type [-- All -- ▶]    Description [ ]

Status [-- All -- ▶]                [Search]
     Change Order
     Quote
[Reset Search] SOW
     Survey Statements of Work (SOWs) Window 230

SOW Management Screen 200

User 1

Home  SOW Approval  Reports  User Directory  Manage▶  202

Advanced Search Window 220

SOW Name  [____]

Type  [-- All -- ▶]

Status  [Pending ▶]
- - All --
- Pending
- Submitted
- Rejected
- Approved

[Reset Search]

SOW Owner  [User 1]

Description  [____]

[Search]

Statements of W...  [+]

FIG. 2G

SOW Management Screen 200 — User 1

Home | SOW Approval | Reports | User Directory | Manage▼ | 202

Advanced Search Window 220

SOW Name: [          ]   SOW Owner: [User 1 ▶]

Type: [-- All --▶]   Description: [          ]

Status: [Pending ▶]   [Search]

[Reset Search]

Statements of Work (SOWs) Window 230

Show SOW Templates   [Add SOW]   [Edit SOW]   [Delete SOW]   [Refresh]   +

Show [10 ▶] entries

| SOW Name | SOW Owner | Type | Status |
|---|---|---|---|
| ⊕ Chicago Tower Project | User 1 | SOW | Pending |
| ⊕ Westside Project | User 1 | SOW | Pending |

Showing 1 to 2 of 2 entries   [Previous] [Next]

FIG. 2H

SOW Management Screen 200

User 1

Home | SOW Approval | Reports | User Directory | Manage ▼

202

Statements of Work (SOWs) Window 230

Show SOW Templates | Add SOW | Edit SOW | Delete SOW | Refresh

Show [10 ▼] entries

| | SOW Name | SOW Owner | Type | Status |
|---|---|---|---|---|
| ⊖ | Chicago Tower Project | User 1 | SOW | Pending |

SOW Description: image capture to cloud with security

SOW Details Window 240

SOW Notes Window 242

User 1    Date/Time

New Note | Add your note here | Add

Attached Files Window 244

Document1.vsdx    Delete ☐

Choose File | No file chosen | Upload

Reject | Approve | Recall

Submit

Previous | Next

Showing 1 to 2 of 2 entries

FIG. 2I

| SOW Name | SOW Owner | Type | Status |
|---|---|---|---|
| Chicago Tower Project | User 1 | SOW | Pending |

SOW Description: image capture to cloud with security

SOW Details Window 240

SOW Notes Window 242

| Photo | User 1  8/19/19 1:21pm<br>SOW created, need integration timeline. |
| Photo | User 2  8/20/19 11:53am<br>Added integration timeline. |
| Photo | User 3  8/21/19 8:35am<br>Added additional details about final milestone. Need revised Ts & Cs from legal. |

New Note: Add your note here    [Add]

Attached Files Window 244

Delete

User 1
   Document1.vsdx  8/19/19 1:30pm  ☐
   Document2.vsdx  8/19/19 1:34pm  ☐

User 4:
   Document3.vsdx  8/21/19 8:18am  ☐

[Choose File] No file chosen    [Upload]

[Reject]  [Approve]  [Recall]

[Submit]

[Previous] [Next]

Showing 1 to 2 of 2 entries

FIG. 2K

SOW Management Screen 200

User 1

Home　SOW Approval　Reports　User Directory　Manage ▶

202

Add New SOW Screen 270

SOW Name

Description

Notes

Type　-- All -- ▼

Required Approval Role　SOW Approver ▼　272

Required Documents　Signed Acceptance ▼　274

Choose File　No file chosen　Upload

Cancel　Save Changes

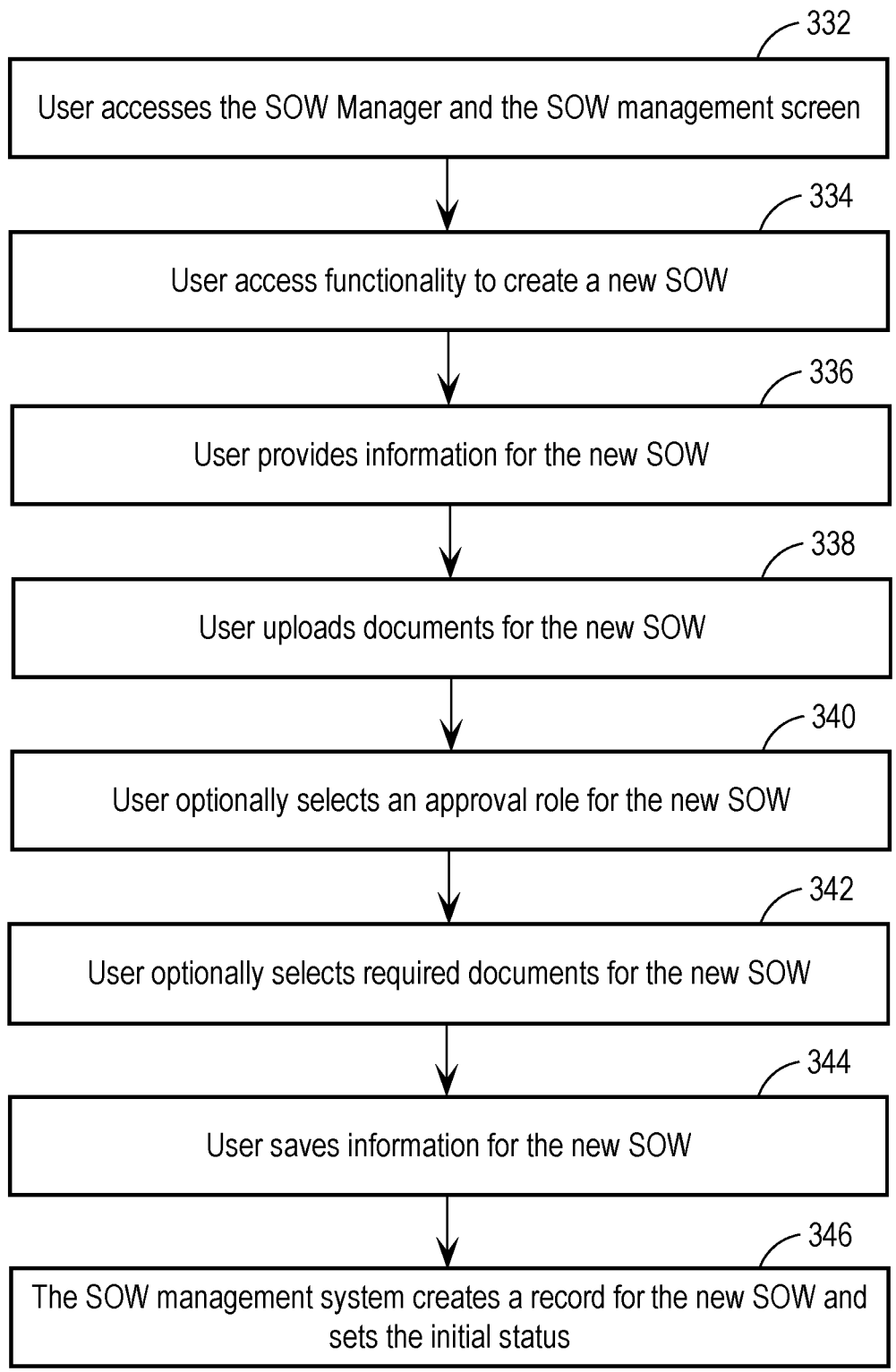
FIG. 3B — Create a new SOW using a SOW template

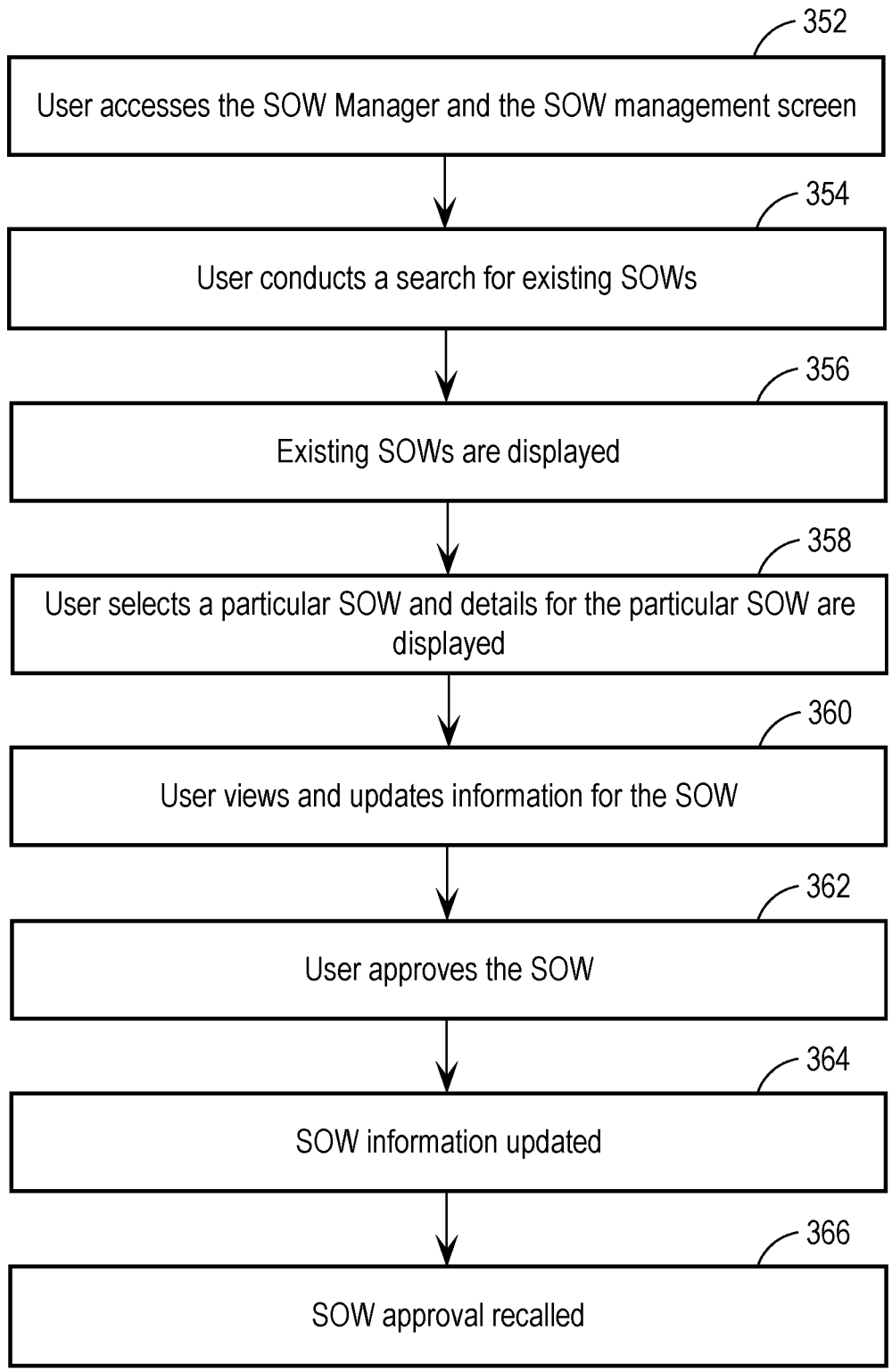

FIG. 5B

SOW Management Screen 200

Home | SOW Approval | Reports | User Directory | Manage ▼     User 1    202

User Management Screen 500

Edit User    Add User: | Name |    Refresh

Search: [ ]

| User ID | User Name | Job Title | Roles | Manager Name |
|---------|-----------|-----------|-------|--------------|
| User1 | David Allison | Engineer | SOW Submitter | Allison Beniger |
| User2 | Mark Wilson | Marketing Mgr | SOW Submitter, SOW Approver | John Albert |
| User3 | Audrey Mott | Vice President | SOW Template Manager, SOW Administrator | Carson Tolbert |

FIG. 5D

SOW Management Screen 200

User 1

| Home | SOW Approval | Reports | User Directory | Manage▼ |

202

Roles Screen 520

[Delete Role] [Edit Role] [Add Role] [Refresh]

| Role | Description |
|---|---|
| SOW Submitter | SOW Approval Process |
| SOW Reviewer | SOW Approval Process |
| SOW Approver | SOW Approval Process |
| SOW Template Manager | SOW Template Management |
| SOW Administrator | SOW Administration |

CREATING AND MANAGING STATEMENTS OF WORK

RELATED APPLICATION DATA AND CLAIM OF PRIORITY

This application is related to U.S. patent application Ser. No. 16/737,320 entitled "CREATING AND MANAGING STATEMENTS OF WORK" filed Dec. 31, 2019, the contents all of which are incorporated by reference in their entirety for all purposes as if fully set forth herein.

FIELD

The technical field of the present disclosure relates to computer-implemented systems for creating and managing Statements Of Work (SOWs).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

A Statement Of Work (SOW) is a document, or a collection of documents, commonly used in the field of project management that defines the requirements and activities of a project, deliverables, pricing, timelines, and terms and conditions for a vendor providing goods/services to a client. After final approval, a SOW may become a binding contract. A SOW may also be thought of as a logical container of documents for a project.

SOWs are conventionally created and managed manually, e.g., created using a word processor and then revised and approved via email. For example, a designated user creates an initial version of a SOW document using a Word processor, and then circulates the document to other users via email. The other users revise the document and then circulate the revised document to all of the users via email. This process is repeated until a final version of the SOW is approved.

There are several issues with the conventional manual approach for creating and managing SOWs. One of the issues is that there is no standard format for SOWs, so the form and content of SOWs varies by business organization and can even vary among different groups and users within the same business organization. A lack of uniformity and consistency in the format of SOWs can increase the amount of time required to review and approve SOWs. Another issue is that there is no mechanism for tracking the revision and approval history of SOWs. This makes it difficult for users to identify the most recent version and approval status of SOWs, which is critical for an efficient and complete review process. For example, users have to manually review email threads to identify the most recent version of a SOW and to determine which users still need to review and approve the SOW. This process is made more difficult when a user leaves a business organization. Moreover, once a SOW has been finally approved, there is no convenient way for users to locate the final approved SOW and its constituent documents.

SUMMARY

A computing device comprises one or more processors, one or more memories, and a Statement Of Work (SOW) manager that is configured to cause, to be displayed on a client device, a user interface that allows a user to create a plurality of SOW documents for a plurality of SOWs based upon a particular SOW template, from a plurality of SOW templates, wherein the particular SOW template has a corresponding required approval role that a user must have to approve a SOW, from the plurality of SOWs.

A computing device comprises one or more processors, one or more memories, and a Statement Of Work (SOW) manager that is configured to cause, to be displayed on a client device, a user interface that allows users to view information for, and upload documents to, each SOW, from a plurality of SOWs. In response to receiving a request from a user to access a particular SOW, from the plurality of SOWs, the SOW manager determines whether the user has a required approval role for the particular SOW. In response to determining that the user has the required approval role for the particular SOW, the SOW manager displays on the user interface, controls that allow the user to approve or reject the particular SOW, and in response to a selection by the user of the approve control, changing a status of the particular SOW to an approved status and preventing any further documents from being uploaded to the particular SOW.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

FIG. 1A is a block diagram that depicts a SOW management arrangement.

FIG. 1C depicts example user data for users of the SOW management system.

FIG. 1D depicts example SOW template data for SOW templates in the SOW management system.

FIG. 1E depicts example SOW data for SOWs in the SOW management system.

FIG. 2C depicts the SOW management screen after the advanced search window has been expanded in response to a user selecting the "+" control.

FIG. 2D depicts an example pull-down menu for the type search criterion.

FIG. 2E depicts an example pull-down menu for the status search criterion.

FIG. 2G depicts the results of the search in the SOWs window.

FIG. 2H depicts a SOW details window overlaid on the SOWs window in response to a user request to view the details for a particular SOW.

FIG. 2I depicts the SOW notes window with notes from three different users added over time as a SOW is created and built.

FIG. 2K depicts an add new SOW screen displayed in response to a user selecting the "Add SOW" control from the SOW management screen.

FIG. 3B is a flow diagram that depicts an approach for creating a new SOW.

FIG. 3C is a flow diagram that depicts an approach for approving SOWs.

FIG. 5B is a block diagram that depicts a user management screen that allows a user to manage other users and in particular, change the roles assigned to a user.

FIG. 5D is a block diagram that depicts a roles screen.

DETAILED DESCRIPTION

Figure 1B:
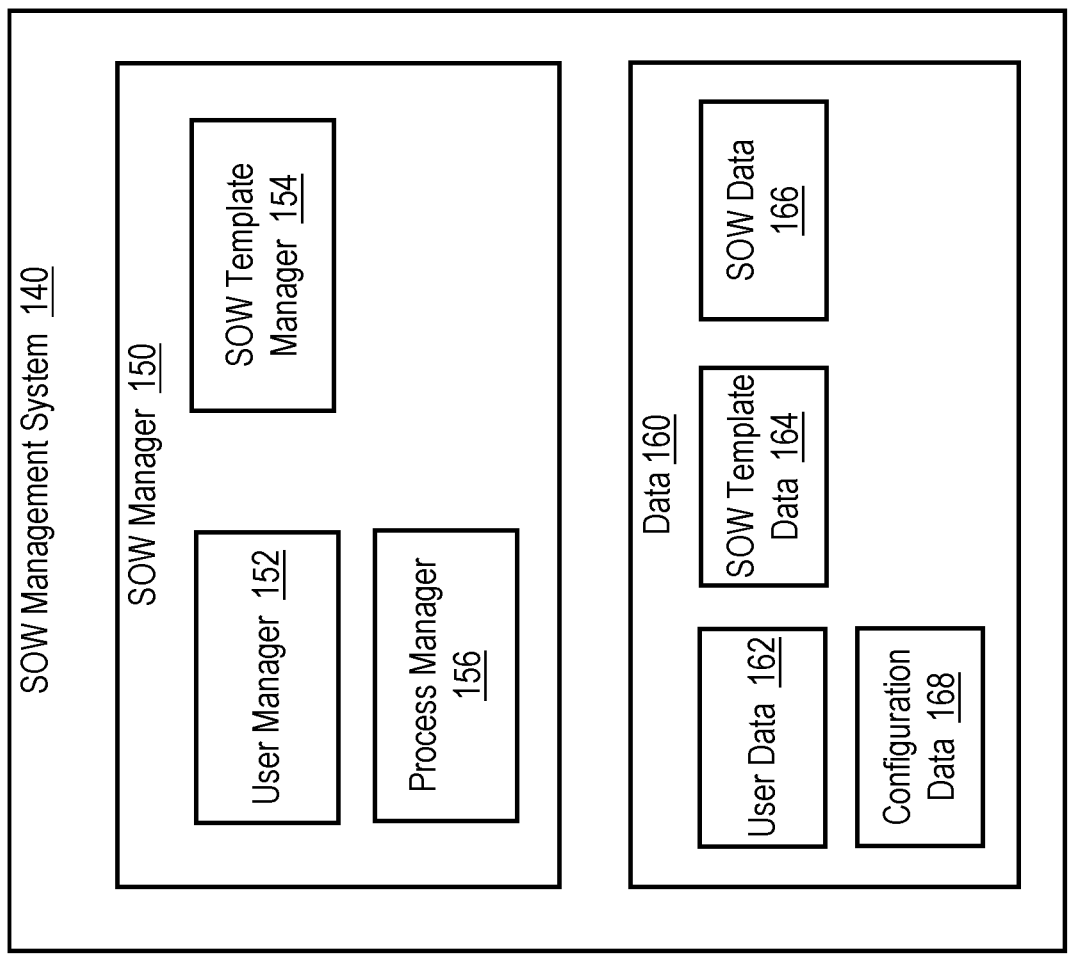
FIG. 1B is a block diagram of an example implementation of the SOW management system that includes a SOW manager and data.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. SOW Management Architecture
  A. Client Devices
  B. Third-Party Services
  C. SOW Management System
III. Creating and Managing SOWs
  A. Viewing and Editing Existing SOWs
  B. SOW Templates
    1. SOW Template Contents
    2. Accessing SOW Templates
    3. Auto-Populating SOW Templates
  C. Creating New SOWs
    1. Required Approval Roles
    2. Recalling SOWs
IV. Approving SOWs
V. User and Role Management
VI. Third Party Systems and Reporting
VII. Implementation Examples

I. OVERVIEW

A SOW management system provides centralized management of SOWs during the entire SOW life cycle, from creation through final approval. The SOW management system includes a search tool that allows users to easily retrieve and manage existing SOWs, and SOW template management functionality that allows users to manage different types of SOW templates that are used to create SOWs. The SOW management system also provides user management, including managing user roles, and tracks changes in SOWs throughout the SOW life cycle. This allows users to create and collaborate on SOWs using a centralized system, instead of the conventional approach of manually tracking changes via email. The SOW management system includes the capability to integrate data from third-party systems and to export data to those systems.

II. SOW MANAGEMENT ARCHITECTURE

FIG. 1A is a block diagram that depicts a SOW management arrangement 100. Arrangement 100 includes client devices 110, 120, 130, a SOW management system 140, and third-party services 180. The elements of FIG. 1A are communicatively coupled via one or more wireless and/or wired computer networks of any type, and/or direct communications links that are not depicted in FIG. 1A for purposes of explanation. Arrangement 100 may include additional or fewer elements, depending upon a particular implementation.

A. Client Devices

The client devices 110, 120, 130 may be implemented by any type of computing device. Examples of client devices 110, 120, 130 include, without limitation, a desktop computer, a workstation, a laptop computer, a personal digital assistant, a tablet computing device, a smart phone, etc. The client devices 110, 120, 130 allow different users to create and manage SOWs using the SOW management system 140. The client devices 110, 120, 130 are configured to access the functionality of the SOW management system 140. For example, the client devices 110, 120, 130 may each include a Web browser, or an application incorporating Web browsing functionality, to access a Web-based user interface provided by the SOW management system 140.

B. Third-Party Services

Third-party services 180 manage data that may be imported into and used by the SOW management system 140 and the data managed by the third-party services 180 may be updated by the SOW management system 140, as described in more detail hereinafter. Examples of third-party services 180 include, without limitation, cloud computing-based services and database management systems.

C. SOW Management System

FIG. 1B is a block diagram of an example implementation of the SOW management system 140 that includes a SOW manager 150 that provides functionality to manage users, create and manage SOW templates, and to create, manage, and participate in the approval of SOWs. The SOW manager 150 includes a user manager 152 for managing users, a SOW template manager 154 for creating and managing SOW templates, and a process manager 156 for creating, editing, and managing the approval of SOWs. Although depicted as separate elements for purposes of discussion, the functionality of the user manager 152, the SOW template manager 154, and the process manager 156 may be integrated into the SOW manager 150. The SOW manager 150 may be implemented by computer hardware, computer software, or any combination of computer hardware and computer software that may vary depending upon a particular implementation. For example, the SOW manager 150 may be implemented as a process executing on one or more computing elements, such as a server, or as a hosted cloud-based service.

The SOW management system 140 also includes data 160 that includes user data 162 that defines users and roles, SOW template data 164 that defines SOW templates, SOW data 166 that defines SOWs, and configuration data 168 used by the SOW management system 140. The data 160 may be organized and stored in any manner that may vary depending upon a particular implementation. For example, the data 160 may be stored in one or more files, in a database management system, etc.

FIG. 1C depicts example user data 162 for users of the SOW management system 140. In this example, the user data 162 includes rows of data that each correspond to a particular user and include a User ID, a User Name, a Job Title, Roles, a Manager Name, a Logical Group, and Contact Information. The Logical Group is any logical group(s) that the user is a member of or associated with. Example logical groups include, without limitation, an organization, a division, a group, a project, a team, a product or service, etc. The roles are used to control access to functionality provided by the SOW management system 140, including the SOW approval process. Example roles include, without limitation, SOW Submitter, SOW Reader, SOW Approver, SOW Template Manager, and SOW Administrator. The roles may represent a hierarchy with increasing permissions. In the prior example, the SOW Submitter roles may have the lowest level of permissions and the SOW Administrator role the highest level of permissions. Users may have more than one role. Information in the user data 162 may be obtained from, and verified, using a directory service, such as Active Directory. The information may also be dynamically updated in response to changes in Active Directory.

FIG. 1D depicts example SOW template data 164 for SOW templates in the SOW management system 140. In this example, the SOW template data 164 includes rows of data that each correspond to a SOW template and include a SOW Template ID, a SOW Template Name, a Description, a Logical Group, a Type, a Creator, and a Required Approval Role. The Role is a role that a user must have to delete the SOW template.

FIG. 1E depicts example SOW data 166 for SOWs in the SOW management system 140. In this example, the SOW data 166 includes rows of data that each correspond to a SOW and include a SOW ID, a SOW Name, a Description, a Logical Group, a Type, an Owner, a Status, Notes, Documents, and a Required Approval Role. As described in more detail hereinafter, the Required Approval Role is a role that a user must have to approve the SOW.

Figure 1F:
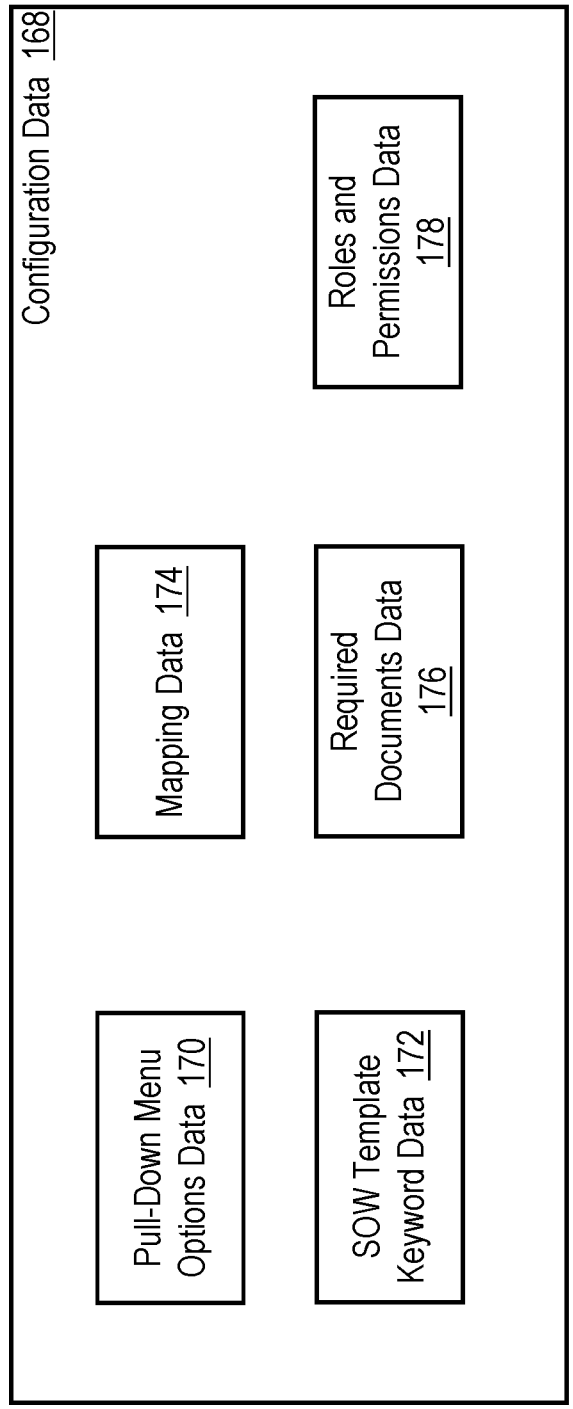
FIG. 1F depicts example configuration data for SOW templates in the SOW management system.

FIG. 1F depicts example configuration data 168 in the SOW management system 140. In this example, the configuration data 168 includes pull-down menu options data 170, SOW template keyword data 172, mapping data 174, required documents data 176, and roles and permissions data 178.

III. CREATING AND MANAGING SOWS

According to an embodiment, the SOW manager 150 provides a Web-based user interface that allows users to manage and create SOW templates and SOWs. The Web-based user interface may be hosted by the SOW manager 150 and accessed via a Web browser on the client devices 110, 120, 130. Alternatively, the Web-based user interface may be integrated into a business application and/or system of an organization. For example, the Web-based user interface may be integrated into a project management system of a business organization.

A. Viewing and Editing Existing SOWs

Figure 2A:
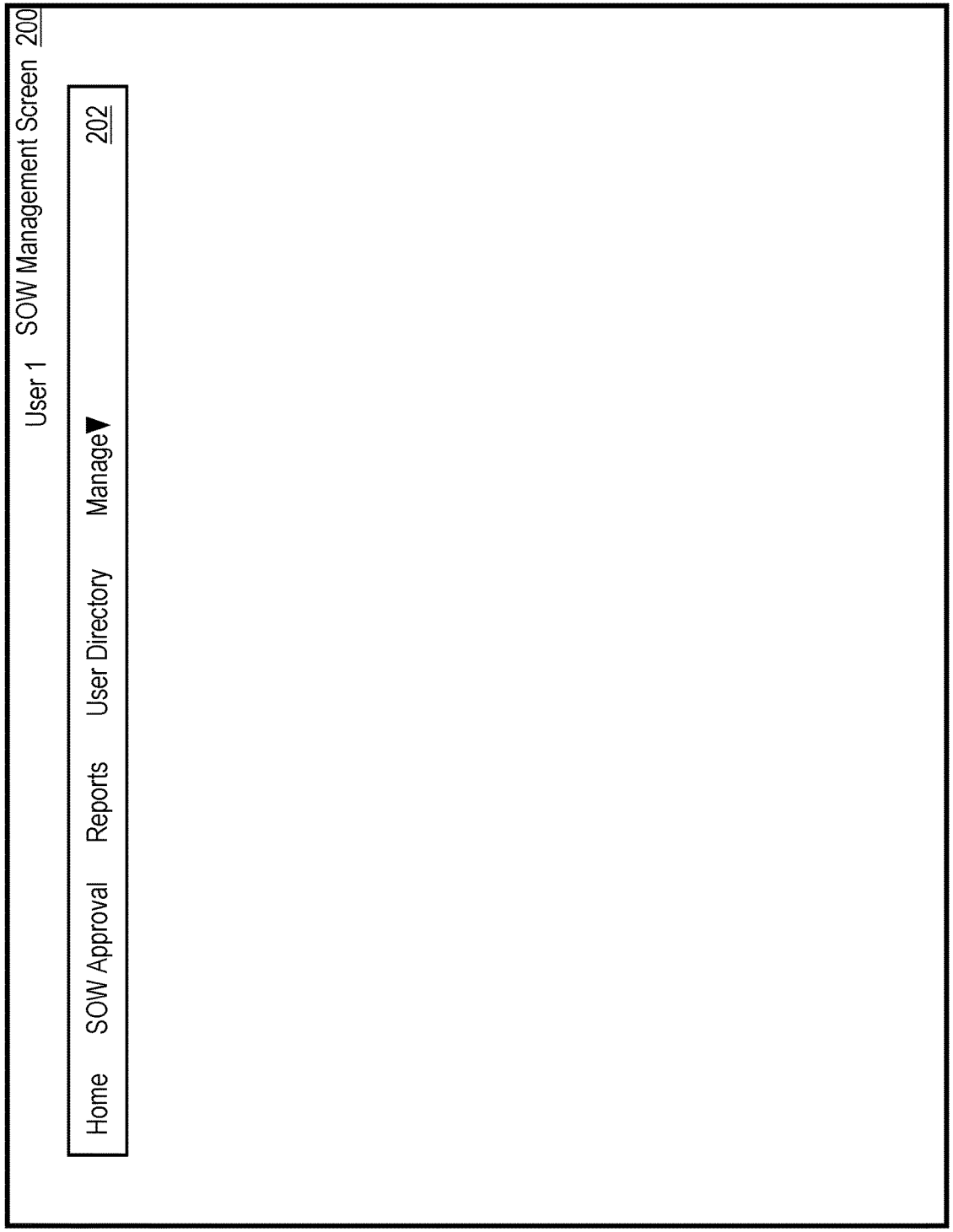
FIG. 2A depicts an example SOW management screen included in the Web-based user interface.

FIG. 2A depicts an example SOW management screen 200 included in the Web-based user interface. The SOW management system 140 may require users to be authenticated before they are allowed access to the SOW management screen 200. The SOW management screen 200 is the starting point or main page of the SOW management user interface and includes controls 202 for accessing different functionality provided by the SOW management system 140.

Figure 2B:
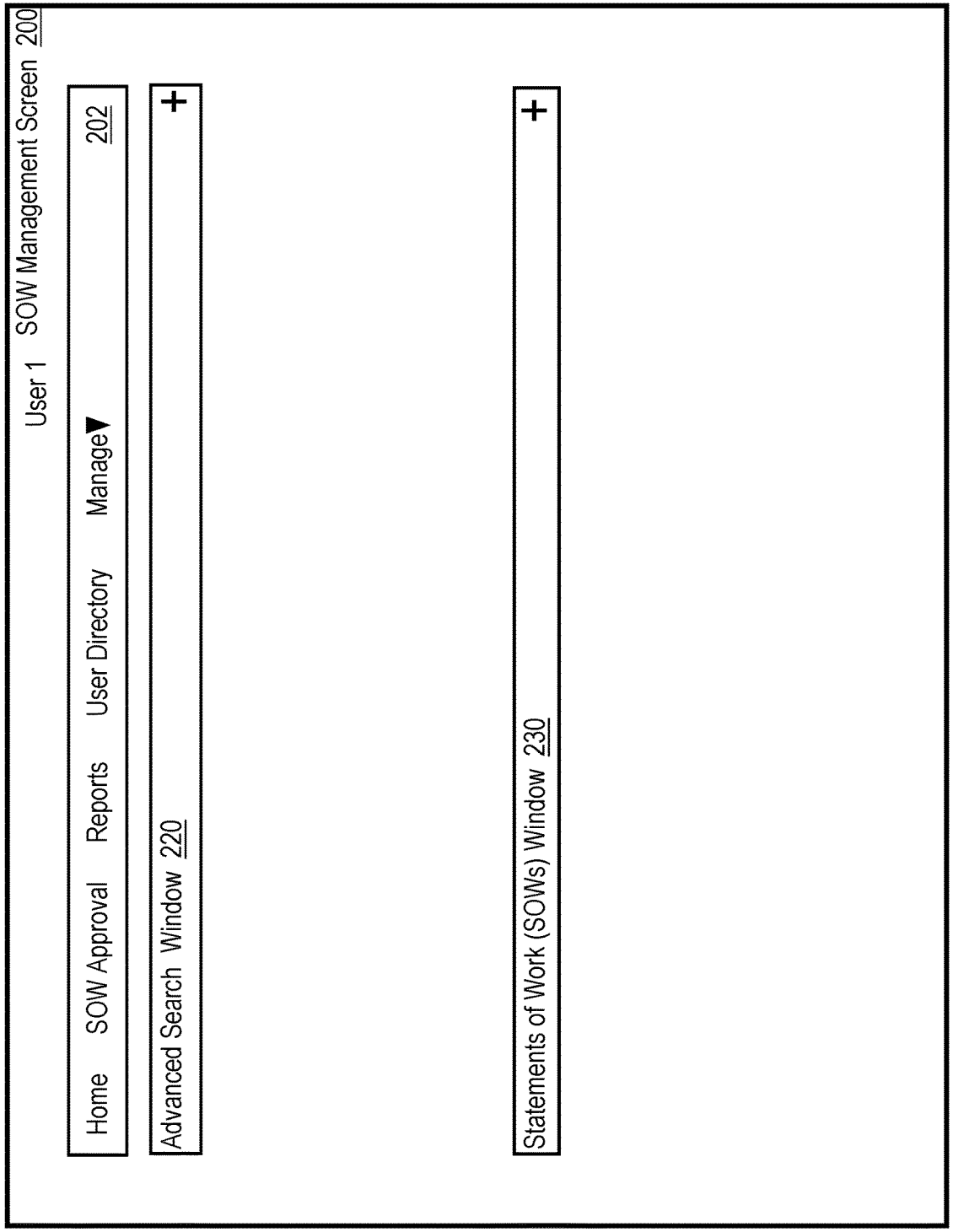
FIG. 2B depicts the SOW management screen with an advanced search window and a statements of work (SOWs) window displayed in response to a user selecting the "SOW Approval" control.

FIG. 2B depicts the SOW management screen 200 with an advanced search window 220 and a statements of work (SOWs) window 230 displayed in response to a user selecting the "SOW Approval" control from the controls 202. The advanced search window 220 and the SOWs window 230 include controls in the form of a "+" for expanding the windows.

FIG. 2C depicts the SOW management screen 200 after the advanced search window 220 has been expanded in response to a user selecting the "+" control. The advanced search window 220 allows a user to search for existing SOWs by entering search criteria. In this example, the search criteria include a SOW Name, Type, Status, SOW Owner, and Description. The SOW Name and Description fields are text entry boxes, while the Type, Status, and SOW Owner fields have pull-down menus, as indicated by the triangle icons. A reset search control resets the search criteria to default values and a search control allows a search for SOWs to be performed based upon the specified criteria. While the figures depict specific examples of the Web-based user interface, embodiments are not limited to these examples.

FIG. 2D depicts an example pull-down menu for the type search criterion and includes options for "All", "Change Order", "Quote", "SOW" and "Survey." The "Change Order" option corresponds to change order documents, the "Quote" option corresponds to quote documents, and the "Survey" option corresponds to survey documents. For purposes of explanation, embodiments are described herein in the context of SOWs, but are not limited to SOWs.

FIG. 2E depicts an example pull-down menu for the status search criterion and includes options for "All", "Pending", "Submitted", "Rejected" and "Approved". These options represent a hierarchy that corresponds to the lifecycle of a SOW. For example, a newly created SOW is first assigned the status of "Pending" while the creator/owner adds information and uploads documents. After all of the information and documents have been added to the SOW and the creator/owner of the SOW submits the SOW via the "Submit" control, the status advances to "Submitted" while it awaits to be approved or rejected by a user having a required approval role. A SOW that is rejected is assigned the status of "Rejected" and a SOW that is approved is assigned the status of "Approved." Once approved the system will automatically archive the SOW for future search and retrieval using the built-in search section.

Figure 2F:
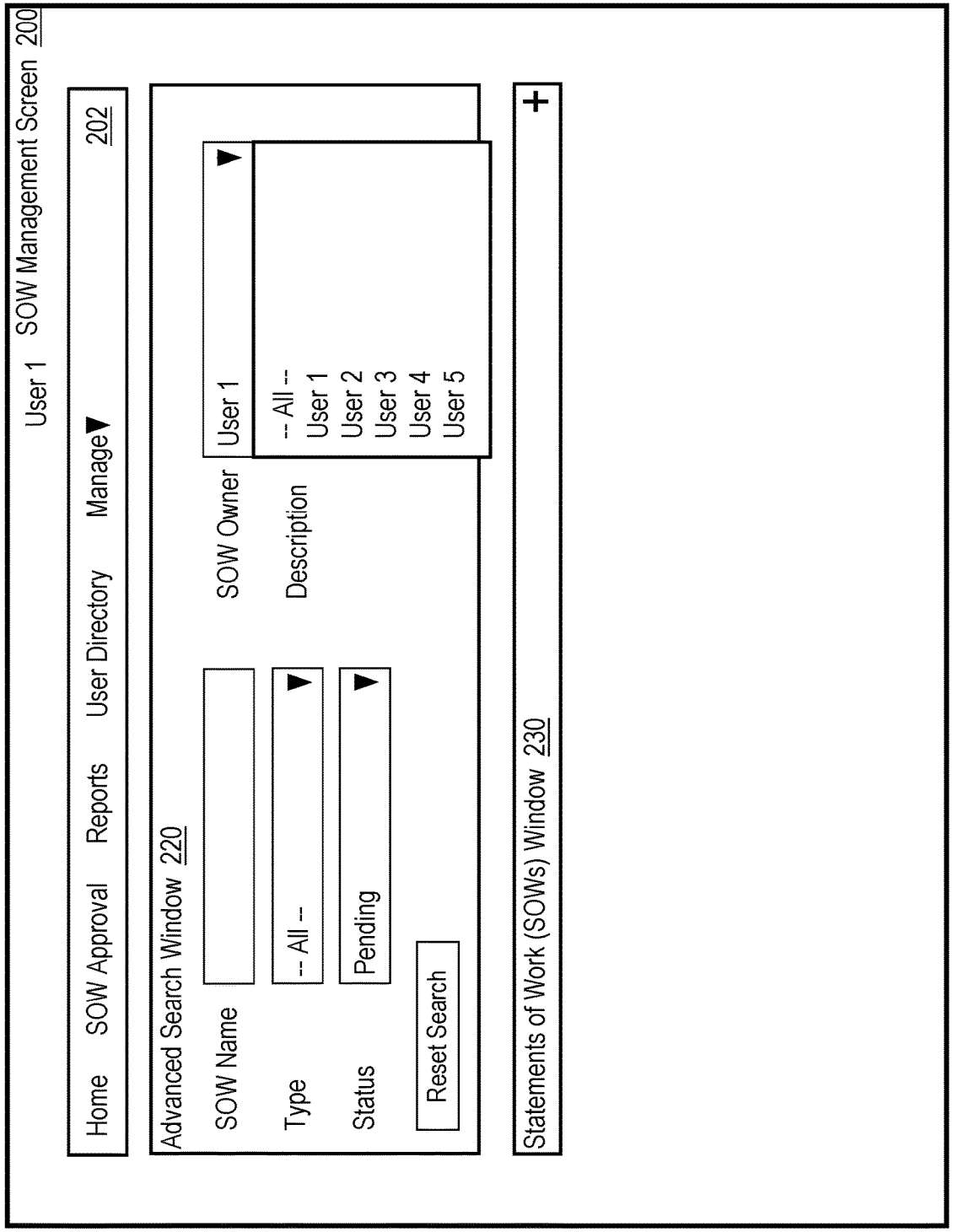
FIG. 2F depicts an example pull-down menu for the SOW owner search criteria and includes options for "All", as well as individual usernames that are depicted as "User 1" through "User 5" for purposes of explanation, although actual usernames may be used.

FIG. 2F depicts an example pull-down menu for the SOW owner search criteria and includes options for "All", as well as individual usernames that are depicted as "User 1"

through "User 5" for purposes of explanation, although actual usernames may be used.

The options provided in the pull-down menus may be configured by an administrator and stored, for example, in pull-down menu options data 170 (FIG. 1F) in the configuration data 168. The SOW manager 150 may provide an administrator user interface, such as a Web-based user interface, for managing data used by the SOW management system 140, such as the configuration data 168. The default values for the advanced search criteria may be established based upon the role of a user. For example, for a user having a role of "SOW Submitter" or "SOW Reader," the only available option for the "SOW Owner" criterium may be the user's own name, so that the user can only see their own SOWs. Alternatively, a user may select from all of the users in their logical group. For example, a user in the "North" logical group may view and select any of the usernames in the "North" logical group. A user having a role of "Administrator" is able to view all users and select one or more users from the drop-down menu. In this example, the value of the "Status" criterium is set to "Pending" to narrow the SOWs to the user's own SOWs that have a current status of "Pending."

After values have been specified for one or more of the search criteria, selecting the "Search" button in the Advanced Search Window 220 causes the SOWs satisfying the search criteria values to be displayed in the SOWs window 230, which may be automatically expanded in response to the selection of the "Search" button or in response to the user selecting the "+" control. FIG. 2G depicts the results of the search in the SOWs window 230. In the present example, two SOWs for the user "User 1" having a current status of "Pending" are displayed in the SOWs window 230. One SOW is for the "Chicago Tower Project" and the other SOW is for the "Westside Project." Any number of SOWs may be displayed in the SOWs Window 230 and "Previous" and "Next" controls allow a user to navigate between multiple pages of SOW results.

Details of an existing SOW may be viewed and updated by selecting a particular SOW from the SOWs window 230, followed by selecting the "Edit SOW" control, or by selecting an expand control depicted in FIG. 2E as a "+" adjacent a particular SOW. Alternatively, the SOW names depicted in FIG. 2E may be directly selectable by a user, for example, via a pointing device such as a mouse.

FIG. 2H depicts a SOW details window 240 overlaid on the SOWs window 230 in response to a user request to view the details for a particular SOW. In this example, the user has requested to view the details for the SOW named "Chicago Tower Project" and the SOW details window 240 window includes a SOW description, a SOW notes window 242 and an attached files window 244.

The SOW notes window 242 allows a user, which in this example is User 1, to add one or more notes for the SOW by selecting and entering text, alphanumeric strings, etc., into the "New Note" window. The notes may comprise any information that the user wishes to specify for the SOW and may include, for example, a comment or question about the SOW. According to an embodiment, notes are date/time stamped to enable display in chronological or reverse chronological order to document changes and progress of the SOW through a SOW life cycle from creation to approval. This allows members of a logical group, such as a team, to view comments and questions from other team members in a centralized location, in order over time, improving the process of creating, modifying, and approving SOWs.

FIG. 2I depicts the SOW notes window 242 with notes from three different users added over time as a SOW is created and built. Each note has a date/timestamp and a corresponding photo next to the username. Controls may be provided to allow a user to scroll up and down through notes. Notes may be persistent in the SOW data 166 and only deleted by administrative users. This may be useful, for example, to satisfy legal and regulatory requirements that require an indelible record be maintained of a SOWs history. According to an embodiment, each note in the SOW notes window 242 is accompanied by a selectable name of the user who created the note. Selecting the name causes the SOW manager 150 to retrieve and display additional information about the user from the user data 162, such as a personal biography, a photo, work experience involving particular SOWs, subject matters of expertise, etc. This additional information is helpful to other users viewing the same SOW because it provides more information about the user who made the note. According to an embodiment, the SOW management system 140 provides a user interface that allows users to view and edit their profile information. The user interface may be accessed by selecting the user's name, e.g., "User 1," from the SOW management screen 200.

Returning to FIG. 2H, the attached files window 244 allows a user to choose and upload files for the SOW. The uploaded files are a collection of documents that describe different information for the SOW. For example, uploaded files may describe requirements and activities of a project, deliverables, pricing, timelines, and terms and conditions for a vendor providing goods/services to a client, as well as signed documents. Examples of uploaded files include, without limitation, word processing documents, spreadsheet documents, presentation documents, images, etc. As with the SOW notes window 242, files uploaded via the attached files window 244 may include a corresponding username and date/timestamp. Uploaded files may be required to conform to one or more specified formats. According to an embodiment, a notification is sent to users in the logical group of a SOW when changes are made to the SOW. For example, the SOW manager 150 generates and transmits a notification to the users in the "North" logical group when a change is made to a SOW in the "North" logical group. This may be applicable to any type of change made to a SOW, such as adding a note or uploading a file, or both. The notification may include information about the change. For example, the SOW manager 150 may generate and transmit an email that indicates that a new note was added to a particular SOW in the "North" logical group and identify the particular SOW. This keeps users informed of changes to SOWs in their logical group.

According to an embodiment, the controls that are made available to users via the SOW management screen 200 depend upon the role of a user. FIGS. 2H and 2I depict controls in the form of checkboxes that allow a user with a required role to delete an attached file. The SOW manager 150 retrieves the role of the user from the user data 162 and then determines whether the controls to delete attached files should be included in the SOWs Window 230 based upon the user's role. For example, the controls to delete attached files are displayed or enabled if the user has a role of "SOW Submitter." Users without the "SOW Submitter" role are not presented with the controls, or the controls are disabled, e.g., greyed out. Alternatively, a user must have the role specified in the Required Approval Role for the SOW in the SOW data 166.

As another example, in FIGS. 2H and 2I, "Reject" and "Approve" controls that allow a user to reject or approve a SOW are provided if the user has the required role of "SOW Approver." More specifically, if a user has the sole of "SOW Approver," then the SOW manager 150 displays/enables the "Reject" and "Accept" controls. Users without the "SOW Approver" role do not see or are not able to select the controls. In this example, the required approval role is determined based upon the value of the Required Approval Role for the SOW in the SOW data 166.

After a user has finished editing and adding information for a SOW, selection of a "Submit" button causes the SOW data 166 to be updated with the current information for the SOW and submitted for approval. More specifically, the new notes and uploaded files, with timestamps, are added/linked to the record for the SOW in the SOW data 166 and the status advanced to "Submitted." A selected SOW may be deleted via selection of the "Delete" control and the information displayed on the SOWs window 230 window may be refreshed via selection of the "Refresh" control. Users may be notified that changes have been made to the SOW. For example, the SOW manager 150 may generate and transmit a notification to the users in the logical group to inform them that the SOW has been updated. The notification may be sent to all users in the logical group or a subset of users in the logical group, for example users that have a role that allows them to approve SOWs.

Figure 3A:
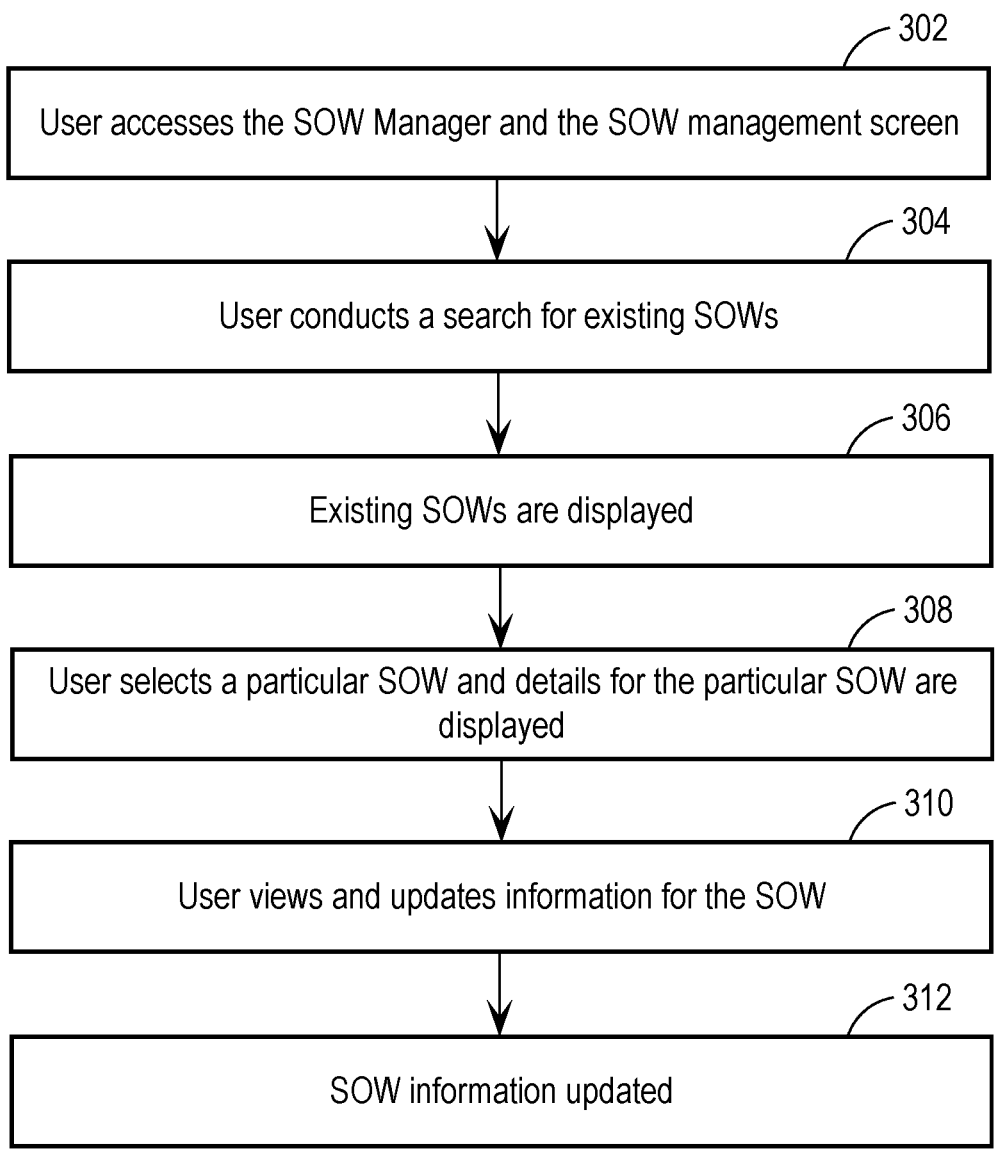
FIG. 3A is a flow diagram that depicts an approach for editing an existing SOW.

FIG. 3A is a flow diagram 300 that depicts an approach for editing an existing SOW. In step 302, the user accesses the SOW management screen 200, for example by logging in to the SOW Manager 150 and selecting a "SOW Approval" option. In step 304, the user conducts a search for existing SOWs. For example, in the SOW management screen 200 of FIG. 2B, the user enters search criteria into the Advanced Search Window 220 and selects the Search control. In step 306, existing SOWs that satisfy the search criteria are displayed to the user. For example, the SOW manager 150 searches the SOW data 166 to identify existing SOWs that satisfy the search criteria specified by the user via the Advanced Search Window 220. The names of identified SOWs with selectable links are displayed in the SOWs Window 230 as depicted in FIG. 2G.

In step 308, a user selects a particular existing SOW, for example by selecting a user interface control or the name of the particular SOW, and details for the particular SOW are displayed. For example, in FIG. 2G the user selects the "Chicago Tower Project" SOW and the details are displayed in FIG. 2H.

In step 310, the user reviews and updates the information for the SOW. This may include adding notes via the SOW notes window 242 and uploading files via the attached files window 244. This may also include approving the SOW if the user has the required role, as described in more detail hereinafter. In step 312, the SOW information is updated. For example, the SOW manager 150 updates the information for the SOW in the SOW data 166. As previously described, the SOW manager 150 may also send a notification to users in the same logical group as the SOW.

B. SOW Templates

According to an embodiment, the SOW manager 150 allows user to create and manage SOW templates, which are used to create new SOWs as described in more detail hereinafter. A SOW template is an electronic document that specifies information to be included in a SOW, such as contents requirements, validation requirements, and approval requirements. SOW templates provide a starting point for creating SOWs with consistent content, structure, and formatting.

1. SOW Template Contents

Figure 4:
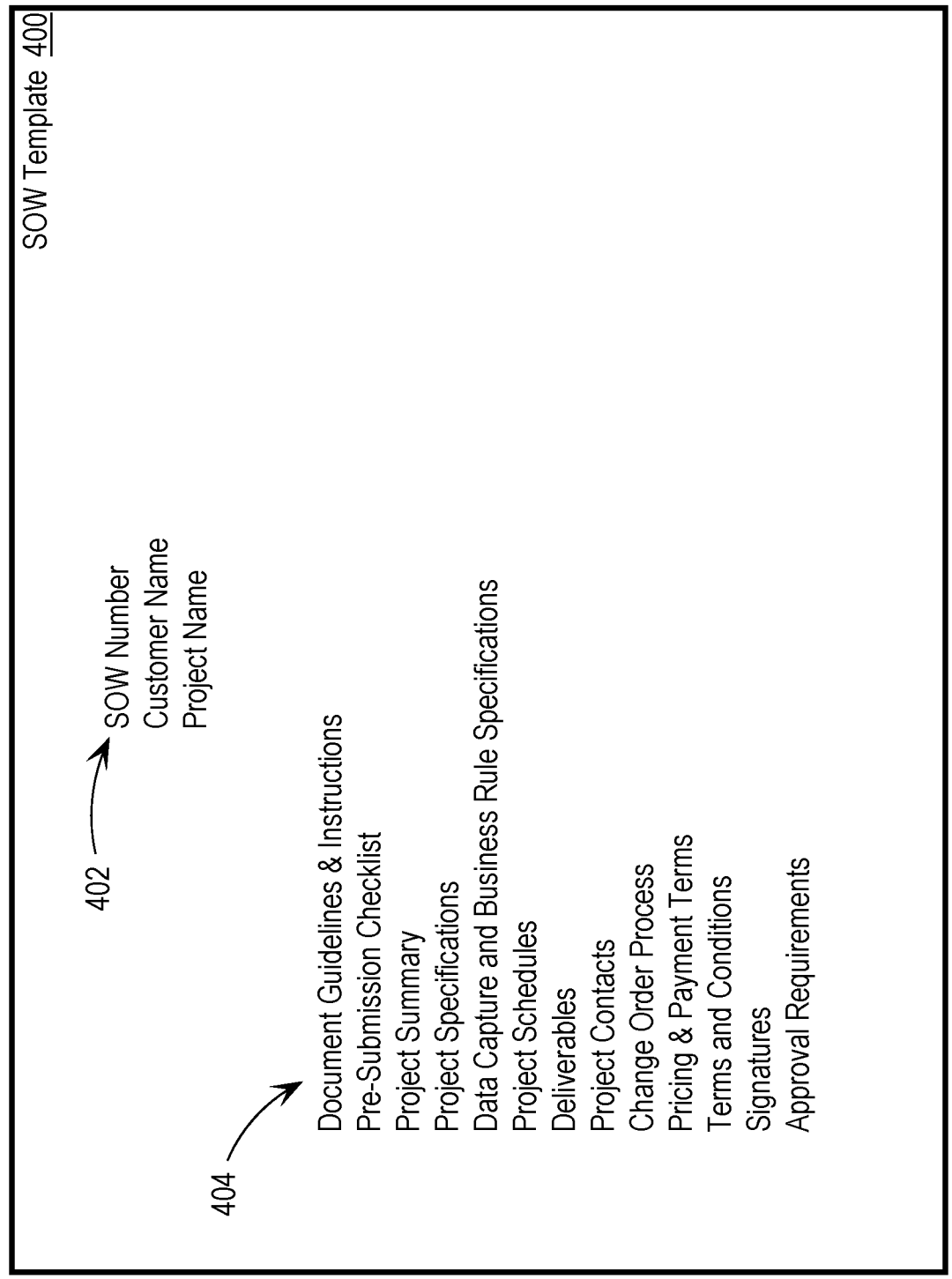
FIG. 4 depicts an example SOW template.

FIG. 4 depicts an example SOW template 400. In this example, the SOW template 300 is a Word document that contains general information 402 and detailed information 404. The general information 402 includes a SOW number, customer name, and a project name that may be implemented as selectable fields that allow a user to enter information for a specific SOW. For example, a user may select the SOW number field and enter a SOW number that will be used to uniquely identify the SOW.

The detailed information 404 includes several categories of information that each may include a large amount of information, in some cases occupying several pages of text and/or images. In the example depicted in FIG. 4, the categories of information include Document Guidelines & Instructions, a Pre-Submission Checklist, a Project Summary, Project Specifications, Data Capture and Business Rule Specifications, Project Schedules, Deliverables, Project Contacts, a Change Order Process, Pricing & Payment Terms, Terms and Conditions, Signatures, and Approval Requirements. These are example categories of information that may vary depending upon a particular implementation and the detailed information for each category is not depicted in FIG. 4 for purposes of brevity.

Information items in the general information 402 and the detailed information 404 may be designated as required, for example via one or more tags or markers in the SOW template, or in metadata for the SOW template. For example, the metadata for a SOW template, or the data for the SOW template in the SOW template data 164, may designate certain information in the SOW template as required. SOW templates may be specific to particular services, vendors, and customers, and may be specific to particular sub-entities within a customer. For example, the SOW template 400 includes a "Data Capture and Business Rule Specifications" section that is specific to digital image processing services and that may not be included in other types of SOW templates. SOW templates may be pre-populated with information. For example, SOW templates may be created for particular customers or projects and pre-populated with information for the particular customers and projects. This may be done manually by the creator of a SOW template.

2. Accessing SOW Templates

Figure 2J:
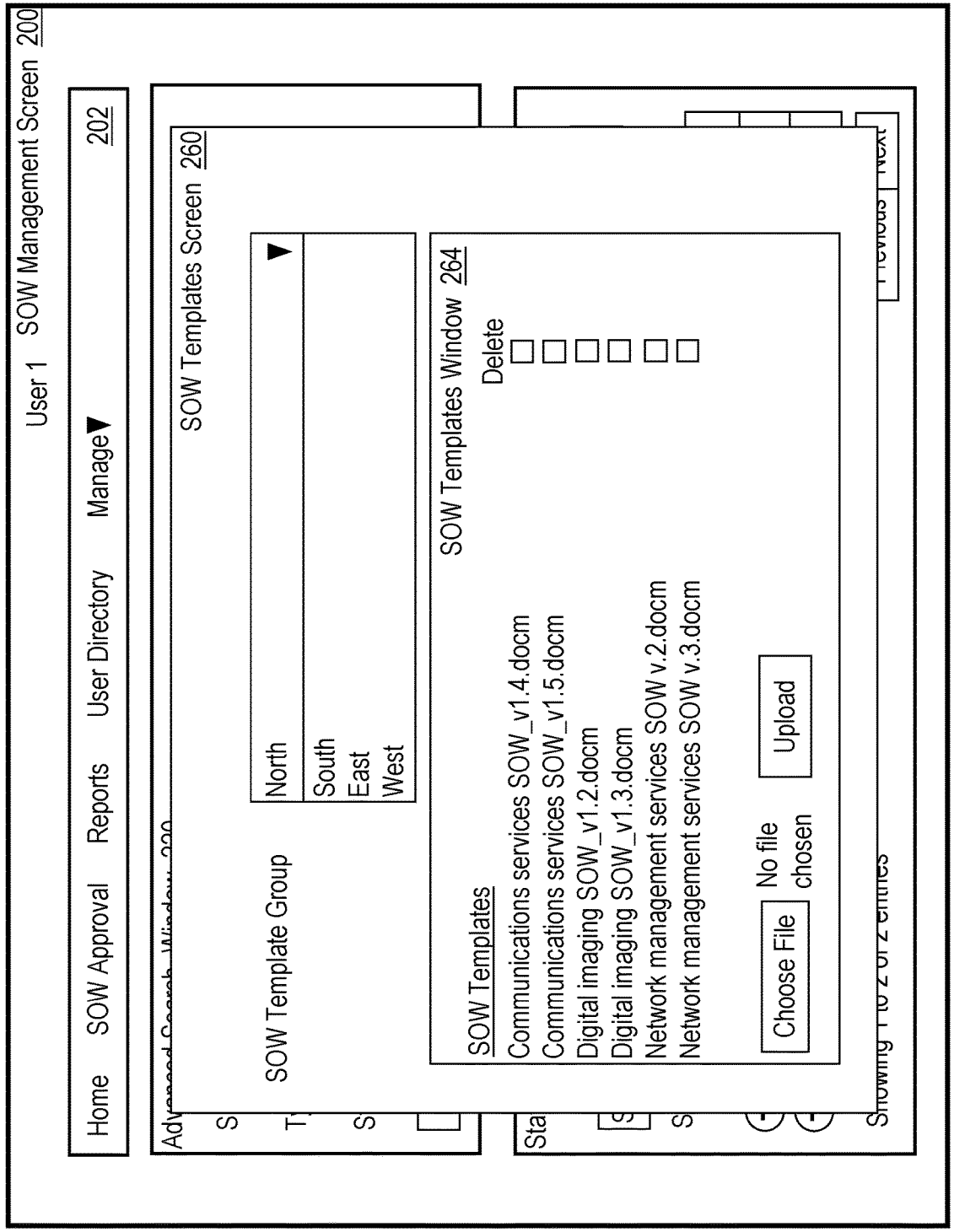
FIG. 2J depicts a SOW templates screen overlaid on the SOW management screen in response to a user selecting the "Show SOW Templates" control.

The SOWs window 230 of FIG. 2G includes a "Show SOW Templates" control which, when selected, displays a list of available SOW templates. FIG. 2J depicts a SOW templates screen 260 overlaid on the SOW management screen 206 in response to a user selecting the "Show SOW Templates" control. The SOW templates screen 260 lists SOW templates by SOW template group, which is the logical group that corresponds to each SOW template. The logical group may be, for example, a business organization, division, project, team, etc. A pulldown menu allows a user to select a particular SOW template group from a set of available SOW template groups which, in the present example include "North", "South", "East" and "West."

According to an embodiment, the logical group of a user determines the SOW templates that are available to the user. For example, a user in the "North" logical group is able to view only the SOW templates that are associated with the "North" logical group. In organizations with a large number of SOW templates, this improves the user experience by limiting the accessible SOW templates to those that are likely to be of interest to the user. For example, a user in a logical group associated with a particular product or service of a business organization is more likely to be interested in SOW templates for the particular product or service, rather than SOW templates associated with other products or services. In addition, this approach prevents users from accessing SOW templates that include sensitive or confidential information. For example, a business organization may create a logical group for a project that involves highly sensitive or classified information. Members of the logical group who work on the project may create SOW templates that contain highly sensitive or classified information related to the project. Restricting access to members of the logical group for the project prevents users who are not part of the logical group from accessing those SOW templates that contain the highly sensitive or classified information. Users may be members of multiple logical groups. For example, a user may be a member of both a group, such as "Hardware Development" or "Software Development," and a project, such as "Pluto" or "Saturn."

According to an embodiment, users with certain roles may view and manage SOW templates for any logical group, including logical groups for which they are not a member. For example, users with the role of "SOW Administrator" may manage SOW templates from any logical group.

A SOW templates window 264 displays the SOW templates for the selected SOW template group. In the present example, the SOW templates window 264 includes six SOW templates in the "North" logical group. As depicted in FIG. 2J, the names of each SOW template provide an indication of the corresponding products and services. For example, the name of the SOW template "Digital Imaging SOW_v1.2.docm" indicates that it is related to digital imaging goods and services.

A user may download and save a SOW template to be used in creating a new SOW by selecting the name of a SOW template or a download/save icon. In response to detecting the user's action to download a SOW template, the SOW manager 150 displays a download window that allows the user to specify a destination and name for the file. For example, a user of a project may select a particular SOW template in the SOW templates window 264 and then download and save the particular SOW template to a file server for the project. The user may then use a file editing tool to view and edit the contents of the saved SOW template to be used for a new SOW, as described in more detail hereinafter.

"Choose File" and "Upload" controls allow users to upload new SOW templates to the selected SOW template group. A new SOW template may be created manually, for example, by a user copying a current SOW template and modifying it for a new project. Delete controls allow the user to delete the SOW templates that they created. For example, a user may delete older versions of a SOW template and retain only the most recent version. Users with certain roles may delete any SOW templates created by anyone, or alternatively, any SOW templates within their logical group. For example, a user in the "North" logical group with the role of "SOW Template Manager" may delete any SOW templates in the "North" logical group, but not SOW templates in other logical groups. The role required to delete SOW templates may also be established on a per-SOW template basis. For example, the Role field in the SOW template data 164 may specify a role required to delete a SOW template. If a role is specified in the SOW template data 164 for a template, then only users with the specified role may delete the corresponding SOW template.

According to an embodiment, the SOW manager 150 makes particular controls available to users based upon their roles. For example, for a user without the required role, the delete controls may be disabled or not displayed in the SOW templates window 264. Alternatively, users without these roles may delete only the SOW templates that they created, but as previously described herein, may select and download any SOW templates in the SOW template group that corresponds to the user's logical group. Note that only SOW templates for the type SOW are displayed for purposes of explanation, but embodiments are not limited to these examples and are applicable to other types of SOW templates, such as change orders, quotes, and surveys.

The aforementioned centralized distribution mechanism for SOW templates that provides a favorable user experience while allowing organizations to control user access to SOW templates using user roles. This includes viewing and managing multiple versions of SOW templates to enable users to view the changes between versions and to use a prior version if desired. For example, 3. Auto-Populating SOW Templates According to an embodiment, when a user uploads a SOW template, at least some of the information in the SOW template is automatically populated by the SOW management system 140. For example, in response to a user uploading a new SOW template to the SOW management system 140, the SOW manager 150 automatically adds information to the new SOW template. To accomplish this, the SOW manager 150 parses the contents of the new SOW template to identify keywords contained in the new SOW template. The keywords are words or phrases that are commonly included in SOW templates and may be stored in SOW template keyword data 172 (FIG. 1F) in the configuration data 168. An administrator of an organization may create and maintain the keywords based upon, for example, the types of goods and services that the organization provides to customers. The SOW manager 150 searches the contents of the new SOW template to determine whether the new SOW template contains any of the keywords stored in the SOW template keyword data 172. Once a keyword is identified, the SOW manager 150 extracts the value associated with the keyword and uses the value to retrieve additional information. The SOW manager 150 then stores the additional information in the SOW template.

For example, suppose that a new SOW template uploaded by a user includes a customer name of "ABC Corp." The SOW manager 150 identifies the customer name keyword in the new SOW template, extracts the "ABC Corp" value, and then retrieves additional information for ABC Corp, for example from third-party services 180. The additional information may include, for example, contact information, pricing and payment terms, terms and conditions, etc., for ABC Corp. The SOW manager 150 adds the additional information at the appropriate locations in the new SOW template by updating the data for the new SOW template in the SOW data 166. For example, the SOW manager 150 adds additional terms and conditions information in the "Terms and Conditions" portion of the general information 402. Supplementing SOW templates in this manner improves consistency and accuracy by obtaining current information from an authoritative source, and also improves the user experience by reducing the amount of data that must be manually entered by users.

C. Creating New SOWs

The SOW management system includes the capability for a user to create new SOWs, including creating new SOWs using SOW templates. FIG. 2K depicts an add new SOW screen 270 displayed in response to a user selecting the "Add SOW" control from the SOW management screen 200. Access to the add new SOW screen 270 may be conditioned upon the user having a role required to create new SOWs.

For example, the SOW manager 150 may verify that the user has the "SOW Submitter" role before granting the user access to the add new SOW screen 270. The add new SOW screen 270 includes controls in the form of text entry boxes and pull-down menus that allow a user to specify a name, type, description, and notes for the new SOW. The pull-down menu values for the type attribute may be the same as those depicted in FIG. 2D and may be obtained from the pull-down menu options data 170.

The add new SOW screen 270 also includes controls for uploading electronic documents for the new SOW, such as a document that a user created from SOW template, data sheets and other product and service information, pricing and schedule information, terms and conditions, etc. Uploaded files may be required to be in a particular format and satisfy a file name requirement that are specified, for example, in the configuration data 168.

The new SOW may be saved or discarded via "Save Changes" and "Cancel" controls. In response to the user selecting the "Save Changes" control, the SOW manager 150 adds a new entry for the SOW in the SOW data 166 and stores the data entered by the user into the new entry, including the SOW name, description, type, and notes. The other attributes for the SOW that are not entered by the user via the add new SOW screen 270, such as the SOW ID, logical group, SOW owner, and status may be automatically specified by the SOW management system 140. For example, the SOW manager 150 may generate and assign a SOW ID for the new SOW, which may be, for example, an alphanumeric value. The value for the logical group attribute may be automatically set to the logical group of the user, e.g., if the user is in the "North" logical group, then the new SOW is given a logical group value of "North." This binds the new SOW to the logical group of the user who created the new SOW. The user's ID is used as the SOW Owner value for the new SOW and the initial value for the Status attribute is set to "Pending." Alternatively, controls may be provided to allow a user to specify values for the SOW ID, logical group, SOW owner, and status. In addition, accessibility to the controls may be conditioned upon the user having a required role. For example, users having the role of "SOW Administrator" may be given access to the controls for specifying the values for these SOW attributes while users without this role are not given access. The SOW manager 150 also stores the required approval role for the new SOW in the SOW data 166.

According to an embodiment, when the creator/owner of a new SOW submits the SOW for approval via the "Submit" control, a SOW review and approval process is initiated. For example, in response to a user selecting the "Submit" control, the status is changed from "Pending" to "Submitted," and a notification is sent to all users in the same logical group of the new SOW that the SOW has been created and is ready for review and modification. In the present example, the user who created the new SOW is in the "North" logical group and the new SOW is automatically assigned to the "North" logical group. After the SOW has been created and information added, and the user has submitted the SOW for approval via the "Submit" control, the SOW manager 150 automatically generates and transmits a notification, such as an email, to all users in the "North" logical group that a new SOW has been created and is ready for review. The notification may include various information about the new SOW, such as the name, a time/date stamp when the new SOW was created, etc. The users are then able to view and add information, such as notes, to the new SOW. This may include editing the SOW documents uploaded by the user and uploading additional documents. New information is saved by the SOW manager 150 and as changes are made or information added, additional notifications are generated and transmitted to users of the "North" logical group. Alternatively, the notification may be transmitted to a subset of users in the "North" logical group, for example users that have a role that allows them to approve new SOWs.

FIG. 3B is a flow diagram 330 that depicts an approach for creating a new SOW. In step 332, the user accesses the SOW management screen 200, for example by logging in to the SOW Manager 150 and selecting a "SOW Approval" option. In step 334, the user accesses functionality to create a new SOW. For example, the user accesses the add new SOW screen 270 of FIG. 2K by selecting the "Add SOW" control from the SOW management screen 200 of FIG. 2G. As previously described herein, access to the add new SOW screen 270 may be conditioned upon the user having a role required to create new SOWs. For example, the SOW manager 150 may verify that the user has the SOW Submitter role before granting the user access to the add new SOW screen 270.

In step 336, the user provides information for the new SOW via the add new SOW screen 270 such as name, type, description, and notes. The SOW manager 150 creates a new record for the SOW in the SOW data 166 with a status of "Pending." In step 338, the user uploads documents for the new SOW. For example, the user uses "Choose File" and "Upload" controls on the add new SOW screen 270 to select and upload electronic documents for the new SOW.

In step 340, the user may optionally select a required approval role for the new SOW, i.e., a role that a user must have to approve the new SOW. For example, the user may select a required approval role using the required approval role control 272 on the add new SOW Screen 270. As described in more detail hereinafter, the required approval role is used during the SOW approval process to allow only users with the required approval role to approve the SOW.

In step 342, the user may optionally specify one or more required documents for the new SOW. The user may select required documents via the required documents control 274 on the add new SOW Screen 270. As described in more detail hereinafter, the SOW approval process ensures that all required documents are included in the SOW before the SOW is allowed to be approved.

In step 344 the user saves the information for the new SOW. For example, the user selects the "Save Changes" control from the add new SOW screen 270. In response to this user selection, in step 346 the SOW manager 150 creates a record for the new SOW in the SOW data 166 and sets the initial status for the new SOW to "Pending." The SOW manager 150 also updates the other information for the new SOW, such as a required approval role and required documents.

IV. APPROVING SOWS

As described in more detail hereinafter, the SOW management system 140 uses user roles to advance and manage the approval process of SOWs. A user must have a required approval role, such as "SOW Approver," to approve a SOW. A required approval role for a new SOW may be established in a variety of different ways. For example, all SOWs within a particular logical group may be assigned the same required approval role. This is useful in situations where a logical group is associated with a particular product or service. For example, the "North" logical group may be associated with particular products and services offered by a business organization and all SOWs in the "North" logical group are automatically assigned a required approval role of "SOW Approver." Users in the "North" logical group must have the "SOW Approver" role to approve SOWs. In this implementation, the configuration data 168 includes mapping data 174 (FIG. 1F) that maps logical groups to required approval roles. When a new SOW is created, the SOW manager 150 uses the logical group of the new SOW to identify one or more corresponding required approval roles from the mapping data 174, and then assigns the one or more required approval roles to the new SOW. An administrative user may use the administrative user interface provided by the SOW manager 150 to configure the mapping data 174 for a particular organization.

As another example, required approval roles may be determined based upon the type of SOW, i.e., each type of SOW has a corresponding approval role. In this implementation, the mapping data 174 maps SOW types to required approval roles. When a new SOW is created, the SOW manager 150 uses the SOW type of the new SOW to identify one or more corresponding required approval roles from the mapping data 174, and then assigns the one or more required approval roles to the new SOW.

As yet another example, required approval roles may be inherited from a SOW template. When a new SOW is created from a SOW template, the required approval role for the SOW template is assigned to the new SOW as a required approval role for the new SOW. For example, when a new SOW is created and a document uploaded, the SOW manager 150 examines the uploaded document to identify a required approval role. The required approval role may be identified by a tag or label, such as "Approval Role." The SOW manager 150 locates the value of the tag or label and saves the value as the required approval role for the SOW.

Alternatively, a user may directly specify a required approval role for a new SOW. According to an embodiment, in FIG. 2K the add new SOW screen 270 includes a required approval role control 272 for specifying a user role required to approve the new SOW. A user may select a role from a pull-down menu and the values in the pull-down menu may be specified by an administrator and stored in the pull-down menu options data 170. One example role is "SOW Approver." Multiple required approval roles may be made available for selection and the multiple required approval roles may represent a required approval role hierarchy. This may be useful in business organizations in which it is desirable to have different required approval roles assigned to a SOW based upon characteristics of the SOW, such as the financial value, complexity, importance, etc., of the products and services being provided by the vendor. For example, a role of "SOW Approver—Level 1" is required to approve SOWs having a value less than a first threshold. A role of "SOW Approver—Level 2" is required to approve SOWs having a value greater than the first threshold but less than a second threshold. A role of "SOW Approver—Level 3 is required to approve SOWs having a value greater than the second threshold. This feature allows organizations to specify required approval roles based upon characteristics of SOWs, that may vary depending upon a particular implementation. The default value for the required approval role in the required approval role control 272 may be, for example, the required approval role specified for the logical group, the SOW type, or from a SOW template used to create the SOW. The user may accept the default value or override the default value and select another value.

According to an embodiment, SOW approval may only be performed by users with a required approval role for the SOW. This provides control over the SOW approval process and also allows organizations to specify the level of granularity for the SOW approval process. For example, as previously described herein, an organization may define an approval role hierarchy to control approval of SOWs for different types/classifications of products and services.

There may be situations where it is important that SOWs have certain required documents prior to being approved, for example, to satisfy an organization policy, or a legal or regulatory requirement. For example, a vendor may require that a SOW include a signed acceptance from an authorized representative of a customer and a current terms and conditions document. As another example, a customer may require that SOWs for large projects include a requirements specification, a preliminary design specification, a detailed design specification, an integration plan, and a list of documentation to be provided upon completion of the project. These are just examples and the particular required documents for a SOW may vary depending upon the implementation.

According to an embodiment, the SOW management system 140 includes a capability for SOWs to have required documents before approval. The configuration data 168 includes required documents data 176 (FIG. 1F) that specifies the required documents for all SOWs in an organization, SOWs of a particular type, all SOWs within a particular logical group, or on a per-SOW basis. An administrative user may manage the required documents data 176, for example, via the administrative user interface provided by the SOW manager 150. For example, the administrative user may specify required documents for SOWs of a particular type, or for all of the SOWs of a logical group, such as a department or team, within an organization. According to an embodiment, the add new SOW screen 270 of FIG. 2K includes a required documents control 274 that allows a user to select one or more required documents from a pull-down menu. The values included in the pull-down menu may be specified in the required documents data 176 and specified by an administrative user. After a user makes a selection, the required documents data 176 is updated to specify the required documents selected by the user for the SOW. The SOW manager 150 refers to the required documents data 176 to ensure that a SOW has all of the required documents before allowing the SOW to be approved.

FIG. 3C is a flow diagram 350 that depicts an approach for approving SOWs. In step 352, the user accesses the SOW management screen 200, for example by logging in to the SOW Manager 150 and selecting a "SOW Approval" option from the controls 202. In step 354, the user conducts a search for existing SOWs. For example, in the SOW management screen 200 of FIG. 2B, the user enters search criteria into the Advanced Search Window 220 and selects the Search control. In step 356, existing SOWs that satisfy the search criteria are displayed to the user. For example, the SOW manager 150 searches the SOW data 166 to identify existing SOWs that satisfy the search criteria specified by the user via the Advanced Search Window 220. The identified SOWs are displayed in the SOWs Window 230 as depicted in FIG. 2G.

In step 358, a user selects a particular existing SOW and details for the particular SOW are displayed. For example, in FIG. 2G the user selects the "Chicago Tower Project" SOW and the details are displayed in FIG. 2H.

In step 360, the user reviews and updates the information for the SOW. This may include adding notes via the SOW notes and uploading files via the attached files window 244. As previously described herein, the "Approve" and "Reject" controls for approving or rejecting a SOW are made available to the user only if the user has the required role. The SOW manager retrieves the approval role for the SOW from the SOW data 166 and determines whether the user has that approval role. For example, if the "Chicago Tower Project" SOW has a require approval role of "SOW Approver—Level 1," the SOW manager 150 determines whether the user has the role of "SOW Approver—Level 1" by examining the data for the user in the user data 144. Users without the required approval role are not permitted to approve the SOW. Assuming that the user has the required role to approve the SOW, then the "Approve" and "Reject" controls are displayed in the SOW details window 240 and in step 362, the user approves the SOW. For example, the user may select the "Approve" control displayed on the SOW details window 240 of FIG. 2H to approve the SOW. The user may also add a note via the SOW notes window 242 to provide information to other users about the approval of the SOW. For example, a user may suggest a change to a SOW document that is relatively minor in nature for correction without delaying the approval of the SOW.

According to an embodiment, the ability for a user to approve a SOW is conditioned on both the user having the required approval role and the SOW having the required documents, if required documents were specified for the SOW. Consider the example where during the creation of a SOW, the user specified that a signed acceptance, a requirements specification, and a project schedule with milestones are required documents for the SOW. The SOW manager 150 determines whether all of these documents have been uploaded for the SOW and does not allow the SOW to be approved if any of these documents are missing. If a user attempts to approve the SOW, for example by selecting the "Approve" control from the SOW details window 240, a message is displayed indicating that one or more required documents are missing and may also specify the particular missing documents.

In step 364, the SOW manager 150 updates the SOW data 166 to indicate that the SOW has been approved, for example, by changing the value in the status field to "Approved." In response to the SOW being approved, the SOW manager 150 may generate and transmit a status message, e.g., an email, to users in the logical group to notify them that the SOW has been approved.

According to an embodiment, once a SOW has been approved, no further changes are allowed to the uploaded documents, i.e., uploaded documents may not be changed or deleted, and new documents may not be uploaded. This ensures that once a SOW has been approved, the SOW has all of the required documents and that those documents cannot be changed.

In step 362, the user may instead reject the SOW by selecting the "Reject" control displayed on the SOW details window 240 of FIG. 2H. In this situation, the SOW manager 150 updates the SOW data 166 to indicate that the SOW has been rejected, for example, by changing the value in the status field to "Rejected" or "Pending." In response to a SOW being rejected, the SOW manager 150 generates and transmits a notification to the creator/owner of the SOW. The notification may also be sent to other users. For example, the SOW manager 150 may transmit the notification another user designated by the creator/owner, to a subset of users in the logical group of the SOW, or to all of the users in the logical group of the SOW. The notification may be, for example, an email, and may include any notes entered via the SOW notes window 242 by the user who rejected the SOW. The notes may include a reason or explanation for the rejection of the SOW and may be entered prior to the user selecting the "Reject" control. Alternatively, in response to a user selecting the "Reject" control, the user may be prompted to enter a note to provide more information to the recipients. The creator/owner of the SOW may then resume work on the SOW, for example, by adding missing documents. The SOW is then again made available for review and approval and the SOW manager changes the status to "Submitted."

In some situations, there may be delays in the SOW approval process. For example, a user may be unavailable to review SOWs because of workload or for other reasons. According to an embodiment, the SOW manager 150 tracks the amount of time that has elapsed since the state of a SOW changed to "Pending" and if the elapsed time exceeds a specified threshold, then a notification is generated and transmitted to users having the required approval role for the SOW. This helps to advance the approval of SOWs waiting to be approved by prompting users with the required approval role to take action.

There may be circumstances where it is desirable to resume work on a SOW that has already been approved. For example, some of the information for the SOW may have changed, e.g., a change in a requirement, a deliverable, schedule, pricing, etc. According to an embodiment, the SOW management system 140 provides the capability for an approved SOW to be recalled to an earlier unapproved state. For example, the SOW details window 240 of FIGS. 2H and 2I include a "Recall" control which, when selected, recalls the current SOW. The earlier unapproved state may be, for example, the "Pending" state to allow users to add and/or delete information for the SOW, although other states may be used depending upon the implementation. The recall state may be specified by the configuration data 168 and may be specified for all SOWs or on a SOW-specific basis.

For example, suppose that after a particular SOW has been approved a determination is made that a change is needed to the terms and conditions for the SOW. The particular SOW may be recalled to an earlier unapproved state, such as "Pending" that allows the electronic document that includes the terms and conditions for the particular SOW to be replaced with an updated version. After the creator/owner of the SOW again submits the SOW by selecting the "Submit" control, the approval process is then performed again as was done when the SOW was initially created, and this may include the SOW manager 150 generating and transmitting notification to the users in the logical group of the SOW to indicate that the SOW is again ready for approval. According to an embodiment, the recall functionality is made available only to a user having the required approval role for the SOW. Thus, the "Recall" control provided in the SOW details window 240 of FIGS. 2H and 2I is made available only to users who have the required approval role for the SOW (and for SOWs having the "Approved" status). According to an embodiment, when an approved SOW is recalled, the SOW data 166 is updated to document the recall of the SOW and any additional actions that are taken. In the prior example, the SOW data 166 is updated to document that the electronic document that includes the terms and conditions for the particular SOW was replaced with an updated version.

Returning to FIG. 3C, in step 366, the SOW approval is optionally recalled by a user having the required approval role selecting the "Recall" control. In response to the user selecting the control, the SOW manager 150 updates the state for the SOW in the SOW data 166.

V. USER AND ROLE MANAGEMENT

Figure 5A:
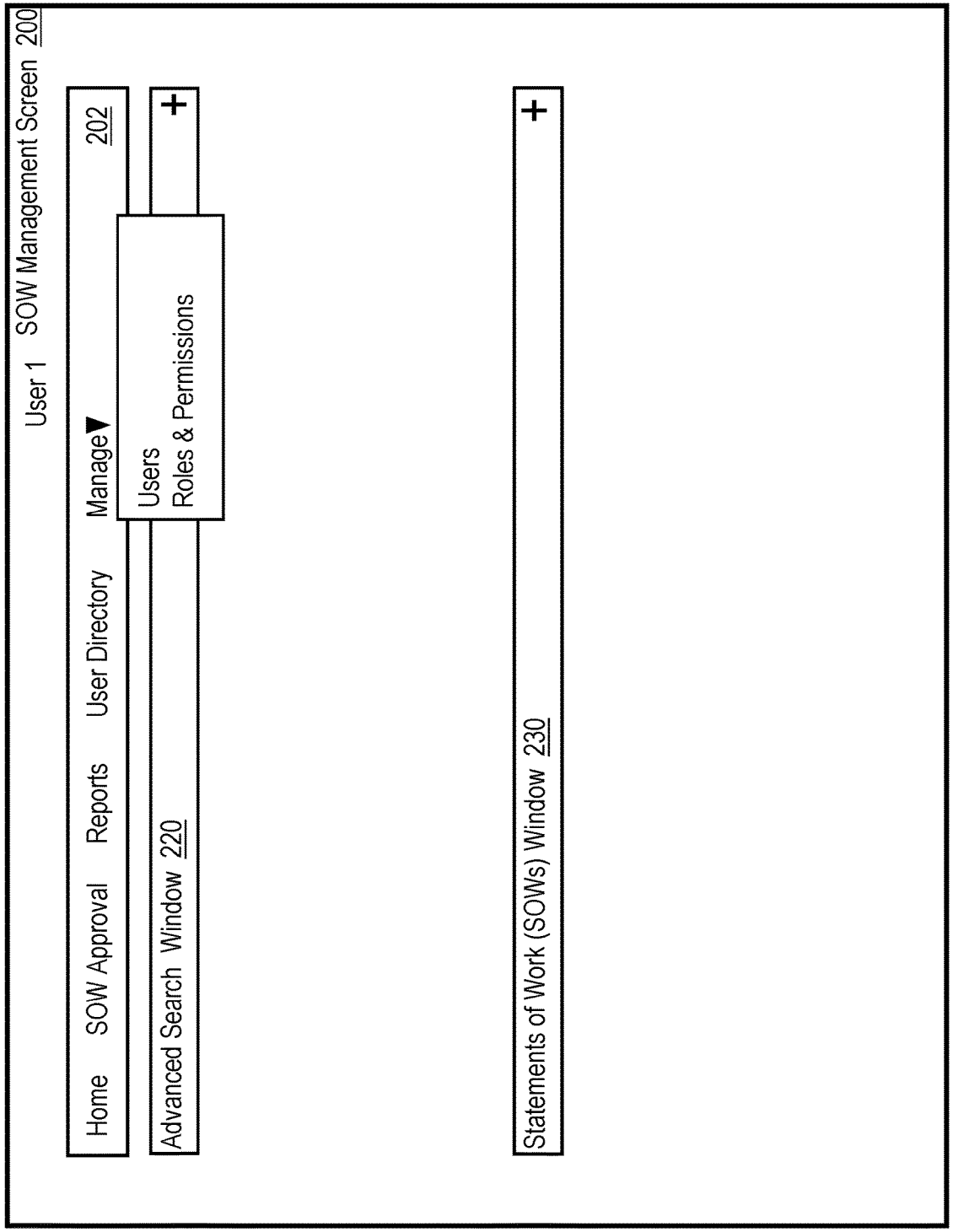
FIG. 5A is a block diagram that depicts a pull-down menu for the "Manage" option from the controls of the SOW management screen.

The SOW management system 140 provides the capability to manage users and permissions and roles. FIG. 5A is a block diagram that depicts a pull-down menu for the "Manage" option from the controls 202 of the SOW management screen 200. In this example, the pull-down menu includes two options: Users and Roles and Permissions, although embodiments are not limited to these examples. The Users option allows a user to manage users, including the roles that are assigned to users. The Roles and Permissions option allows a user to manage roles and permissions that are available for assignment to users.

FIG. 5B is a block diagram that depicts a user management screen 500 that allows a user to manage other users and in particular, change the roles assigned to a user. Access to the user management screen 500 may be conditioned upon a user having a required role, such as user administrator. Users without the required role may not manage other users. A user may select a particular user and then select an "Edit User" control to edit the information for the selected user. A Search box allows a user to search for a particular user by user ID or username.

Figure 5C:
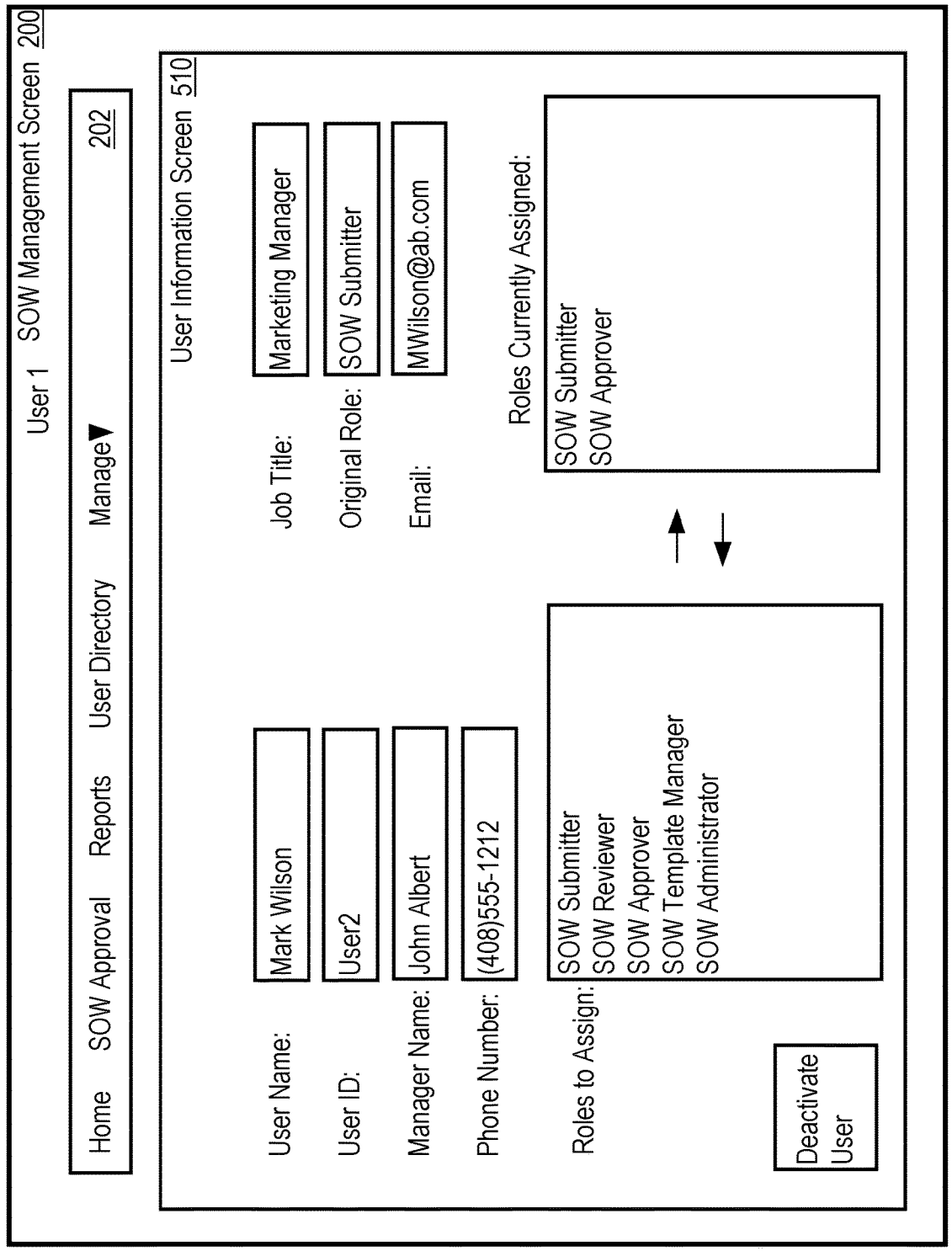
FIG. 5C is a block diagram that depicts a user information screen.

FIG. 5C is a block diagram that depicts a user information screen 510 displayed in response to a user selecting a particular user and the "Edit User" control from the user management screen 500. The user information screen 510 displays information about the user, such as user's name, user ID, manager's name, phone number, job title, email, etc. The particular information included in the user information screen 510 may vary depending upon a particular implementation and embodiments are not limited to the example information depicted in FIG. 5C. The user information screen 510 also displays the original role assigned to the user.

The user information screen 510 allows a user to add or remove roles to/from the selected user by selecting a role and then an arrow icon to add or remove a role. For example, the user may select the "SOW Administrator" role and the right arrow to add the role to the user. Similarly, the user may select a currently assigned role, such as "SOW Submitter" and the left arrow to remove the role from the user.

An "Add User" control allows a new user to be added by entering a username. According to an embodiment, the information for the user is retrieved and automatically populated from a directory service, such as Active Directory. One or more roles may then be designated for the new user. In addition, if a user leaves an organization, the user's information is maintained in the SOW management system 140, but the user is no longer allowed to access the SOW management system 140. A "Deactivate User" control allows a user to be deactivated from the SOW management system 140.

According to an embodiment, the SOW management system 140 includes the capability to automatically add roles to users based upon job title. When a new user is created, or when a new job title is added to a user, the SOW manager 150 accesses the roles and permissions data 178 in the configuration data 168 to identify one or more roles that correspond to the job title. The identified roles are automatically added to the user as default roles that may be manually removed or supplemented using the user information screen 510. Also, roles that are automatically added to a user as default roles may be manually added to other users, even if those other users do not have the corresponding job title.

FIG. 5D is a block diagram that depicts a roles screen 520 displayed in response to a user selecting the "Roles & Permissions" option from the pull-down menu for the "Manage" option from the controls 202 of the SOW management screen 200. The roles screen 520 lists currently defined roles and a corresponding description. "Delete," "Edit," and "Add" controls allow a user to delete, edit, and add roles, respectively, and a "Refresh" control refreshes the information displayed on the roles and permissions screen. Selecting a particular role and then the "Edit" control, or selecting the "Add" control, allows a user to edit and specify, respectively, detailed information for a role.

Figure 5E:
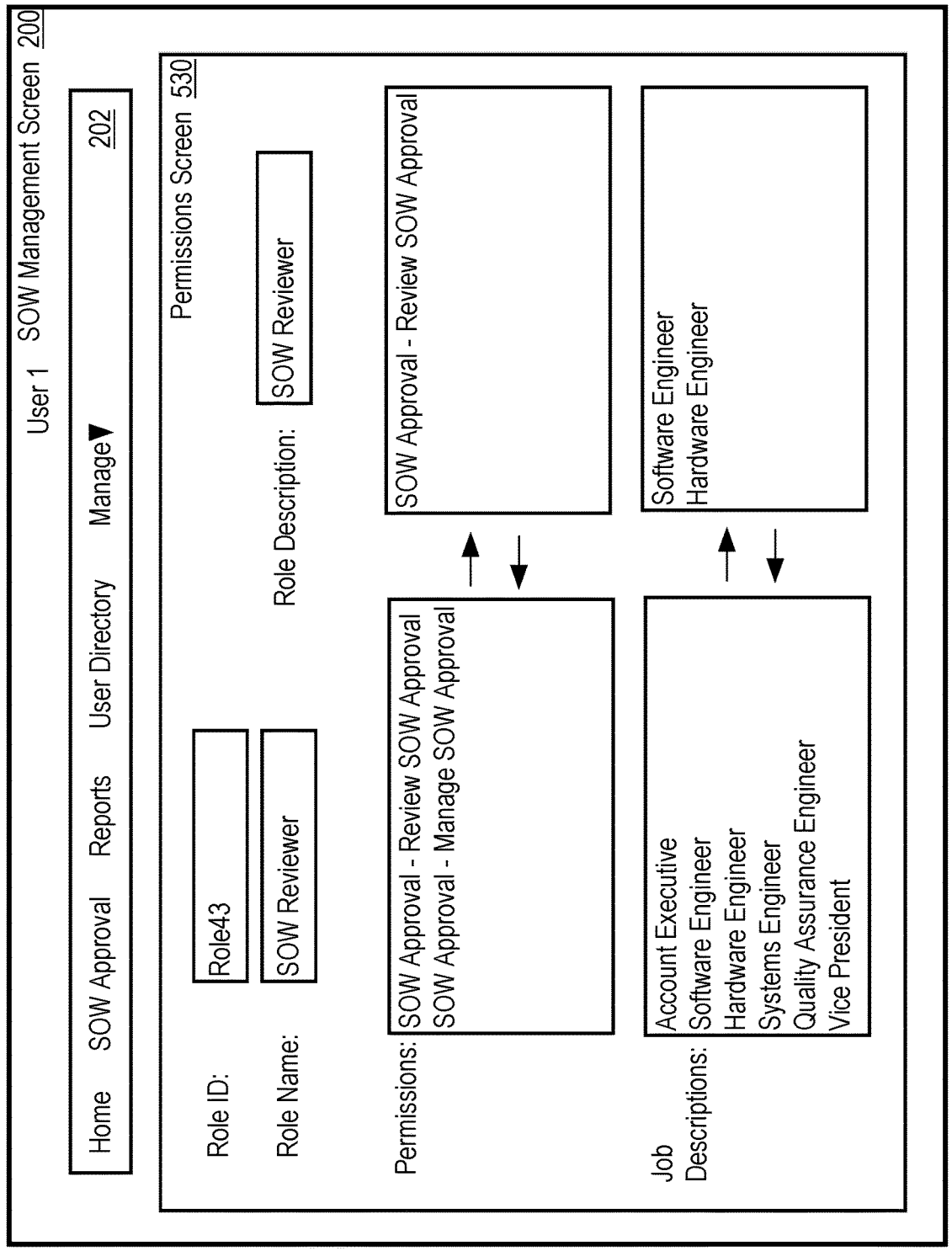
FIG. 5E depicts a permissions screen displayed in response to a user selecting the "Edit" or "Add" control from the roles screen.

FIG. 5E depicts a permissions screen 530 displayed in response to a user selecting the "Edit" or "Add" control from the roles screen 520. The permissions screen 530 displays information for an existing role named "SOW Reviewer." For new roles, the fields are blank. The permissions screen 530 allows a user to specify permissions and job descriptions for the role. The permissions define actions that a user having the role is allowed to perform. In the example depicted in FIG. 5E, the "SOW Reviewer" role allows a user to review SOWs during the SOW approval process. Permissions may be added to or removed from the role using the arrow controls. The job descriptions specified for the role define the users to which the role will automatically be assigned when the users have the job description. In the example depicted in FIG. 5E, users that have the "Software Engineer" or "Hardware Engineer" job description will automatically be assigned the "SOW Reviewer" role.

VI. THIRD-PARTY SYSTEMS AND REPORTING

According to an embodiment, the SOW management system 140 includes the capability to update third-party systems with data from the SOW management system 140. As users provide and update data in the SOW management system, for example by entering data into SOWs or editing data in SOWs, the new and updated data is pushed to third-party services 180 that are the sources of that data. For example, suppose that a user of the SOW management system 140 changes customer data in a SOW. The SOW manager 150 includes the capability to push the changed data to a particular third-party service 180 where the data is sourced. This may include generating and transmitting, to the particular third-party service 180, one or more data update requests that conform to an Application Program Interface (API) of the particular third-party service 180.

According to an embodiment, the SOW management system 140 includes the capability to generate metrics and reports on various aspects of SOWs. Example metrics include, without limitation, the number of SOWs and amount of time in each state, e.g., submitted, pending, rejected, approved, or all, at any point in time or over various periods of time, e.g., by day, week, month, year, etc., and the total time to approve SOWs. Since each step of the SOW approval process has a date/time stamp, metrics can be determined for each step in the SOW approval process. Metrics may be determined on a per-user, per-logical group basis or per-industry basis (based upon an industry attribute for each SOW). For example, metrics may include the total number of SOWs by state and/or by user. Another example metric is the number of SOWs created/owned by user. These metrics allow the performance of users involved in the SOW approval process to be easily evaluated.

Metrics may be reported in any manner that may vary depending upon a particular implementation, for example, via graphs, pie charts, bar charts, tables, etc. One example is a chart depicting the "Top 10" users that are creators/owners of SOWs. The chart may be selectable to "drill down" and view additional details. For example, selecting a particular user from the list of "Top 10 SOW Creators/Owners" displays a list of the SOWS created/owned by the particular user.

VII. IMPLEMENTATION EXAMPLES

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
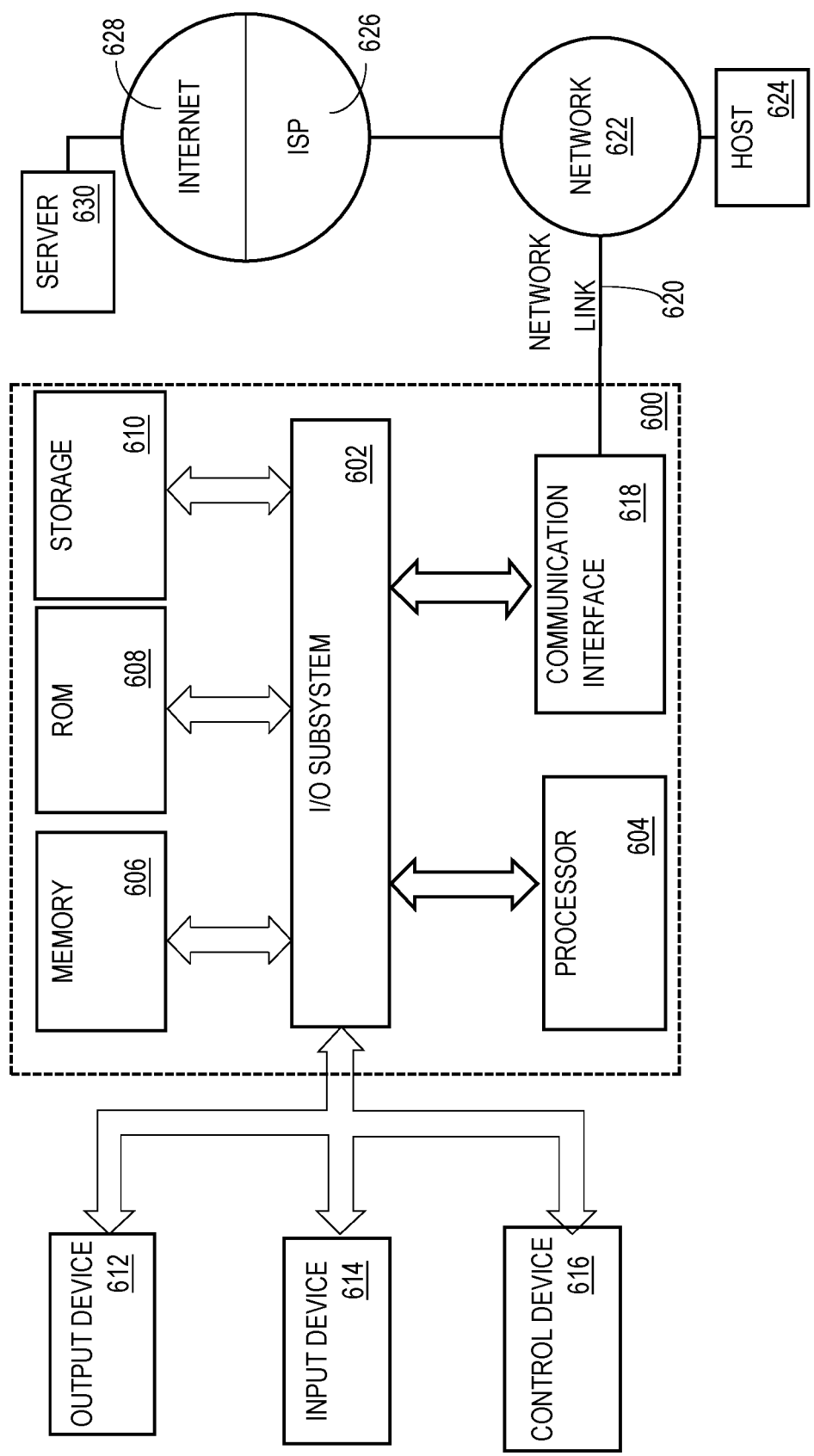
FIG. 6 is a block diagram that depicts an example computer system upon which embodiments may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A computing device comprising:
one or more processors;
one or more memories; and
a Statement Of Work (SOW) manager configured to:
cause, to be displayed on a client device, a user interface with controls that allows a user to create a plurality of SOWs based upon a particular SOW template, from a plurality of SOW templates, wherein the particular SOW template has a required approval role that is automatically assigned to each SOW that is created from the particular SOW template and the required approval role is a role that a user must have to approve the SOW;
in response to a first user creating a particular SOW based upon the particular SOW template, automatically assign a pending status to the particular SOW and automatically assign the required approval role from the particular SOW template to the particular SOW, wherein creating the particular SOW comprises uploading, by the first user, a set of documents to the particular SOW in the pending status;
in response to a request to submit the particular SOW for approval:
change the status of the particular SOW from the pending status to a submitted status,
generate a notification that the particular SOW has been created and is ready for review, and
send the notification to a plurality of users in a logical group of the particular SOW, wherein users within the plurality of users are able to add one or more documents to the set of documents in the particular SOW in the submitted status;
in response to a request by a second user to approve the particular SOW in the submitted status, determine whether the second user has the required approval role to approve the particular SOW; and
in response to determining that the second user does have the required approval role to approve the particular SOW:
change the status of the particular SOW from the submitted status to an approved status,
prevent changes from being made to the set of documents of the particular SOW and additional documents from being added to the set of documents, and generate and transmit an approval notification to a plurality of users in a logical group of the particular SOW;

in response to a user request to recall the particular SOW in the approved status, from the plurality of SOWs, wherein the user request is from a user with a role required to approve the particular SOW:
change the status of the particular SOW from the approved status to an unapproved status, and
generate and transmit a recall notification to the plurality of users in the logical group of the particular SOW, wherein the recall notification indicates that the particular SOW is ready to be reapproved.

2. The computing device as recited in claim 1, wherein the required approval role for the particular SOW template is determined by one or more of a type of the particular SOW template, a logical group of the particular SOW template, or by a user selection of the required approval role via the user interface.

3. The computing device as recited in claim 1, wherein the particular SOW template is at least partially automatically populated with data from a third-party service based upon information contained in the particular SOW template.

4. The computing device as recited in claim 1, wherein the user interface displays a plurality of versions of the particular SOW template and includes controls that allow the first user to select the particular SOW template from the plurality of versions of the particular SOW template.

5. The computing device as recited in claim 1, wherein: the plurality of SOW templates corresponds to a logical group of the first user, and the first user is not permitted to access SOW templates from other logical groups.

6. The computing device as recited in claim 1, wherein the required approval role is automatically assigned to the second user based upon a job description of the second user.

7. The computing device as recited in claim 1, wherein creating the particular SOW comprises specifying one or more documents required for approval of the particular SOW and wherein the SOW manager is further configured to:
in response to the request by the second user to approve the particular SOW determine whether the set of documents includes the one or more documents required for approval of the particular SOW, and
in response to determining that the set of documents does not include the one or more documents required for approval of the particular SOW, not allowing approval of the particular SOW.

8. The computing device of claim 7, wherein the one or more documents required for approval of the particular SOW include at least one signed document.

9. The computing device as recited in claim 1, wherein the SOW manager is further configured to:
in response to a change made to the particular SOW, automatically generate and transmit to the plurality of users in the logical group of the particular SOW, a notification of the change made to the particular SOW.

10. One or more non-transitory computer-readable media comprising:
one or more processors;
one or more memories; and
a Statement Of Work (SOW) manager configured to:
cause, to be displayed on a client device, a user interface with controls that allows a user to create a plurality of SOWs based upon a particular SOW template, from a plurality of SOW templates, wherein the particular SOW template has a required approval role that is automatically assigned to each SOW that is created from the particular SOW template and the required approval role is a role that a user must have to approve the SOW;

in response to a first user creating a particular SOW based upon the particular SOW template, automatically assigning assign a pending status to the particular SOW and automatically assign the required approval role from the particular SOW template to the particular SOW, wherein creating the particular SOW comprises uploading, by the first user, a set of documents to the particular SOW in the pending status;

in response to a request to submit the particular SOW for approval:
change the status of the particular SOW from the pending status to a submitted status,
generate a notification that the particular SOW has been created and is ready for review, and
send the notification to a plurality of users in a logical group of the particular SOW, wherein users within the plurality of users are able to add one or more documents to the set of documents in the particular SOW in the submitted status;

in response to a request by a second user to approve the particular SOW in the submitted status, determine whether the second user has the required approval role to approve the particular SOW; and in response to determining that the second user does have the required approval role to approve the particular SOW:
change the status of the particular SOW from the submitted status to an approved status,
prevent changes from being made to the set of documents of the particular SOW and additional documents from being added to the set of documents, and
generate and transmit an approval notification to a plurality of users in a logical group of the particular SOW;

in response to a user request to recall the particular SOW in the approved status, from the plurality of SOWs, wherein the user request is from a user with a role required to approve the particular SOW:
change the status of the particular SOW from the approved status to an unapproved status, and
generate and transmit a recall notification to the plurality of users in the logical group of the particular SOW, wherein the recall notification indicates that the particular SOW is ready to be reapproved.

11. The one or more non-transitory computer-readable media as recited in claim 10, wherein the required approval role for the particular SOW template is determined by one or more of a type of the particular SOW template, a logical group of the particular SOW template, or by a user selection of the required approval role via the user interface.

12. The one or more non-transitory computer-readable media as recited in claim 10, wherein the particular SOW template is at least partially automatically populated with data from a third-party service based upon information contained in the particular SOW template.

13. The one or more non-transitory computer-readable media as recited in claim 10, wherein the user interface displays a plurality of versions of the particular SOW template and includes controls that allow the first user to select the particular SOW template from the plurality of versions of the particular SOW template.

14. The one or more non-transitory computer-readable media as recited in claim 10, wherein:

the plurality of SOW templates corresponds to a logical group of the first user, and the first user is not permitted to access SOW templates from other logical groups.

15. The one or more non-transitory computer-readable media as recited in claim 10, wherein the required approval role is automatically assigned to the second user based upon a job description of the second user.

16. The one or more non-transitory computer-readable media as recited in claim 10, wherein creating the particular SOW comprises specifying one or more documents required for approval of the particular SOW and wherein the SOW manager is further configured to:
   in response to the request by the second user to approve the particular SOW determine whether set of documents includes the one or more documents required for approval of the particular SOW, and
   in response to determining that set of documents does not include the one or more documents required for approval of the particular SOW, not allowing approval of the particular SOW.

17. The one or more non-transitory computer-readable media of claim 16, wherein the one or more documents required for approval of the particular SOW include at least one signed document.

18. A computer-implemented method comprising:
   causing, by a Statement Of Work (SOW) manager to be displayed on a client device, a user interface with controls that allows a user to create a plurality of SOWs based upon a particular SOW template, from a plurality of SOW templates, wherein the particular SOW template has a required approval role that is automatically assigned to each SOW that is created from the particular SOW template and the required approval role is a role that a user must have to approve the SOW;
   in response to a first user creating a particular SOW based upon the particular SOW template, automatically assigning a pending status to the particular SOW and automatically assigning the required approval role from the particular SOW template to the particular SOW, wherein creating the particular SOW comprises uploading, by the first user, a set of documents to the particular SOW in the pending status;
   in response to a request to submit the particular SOW for approval:
      changing the status of the particular SOW from the pending status to a submitted status,
      generating a notification that the particular SOW has been created and is ready for review, and
      sending the notification to a plurality of users in a logical group of the particular SOW, wherein users within the plurality of users are able to add one or more documents to the set of documents in the particular SOW in the submitted status;
   in response to a request by a second user to approve the particular SOW in the submitted status, determine whether the second user has the required approval role to approve the particular SOW; and
   in response to determining that the second user does have the required approval role to approve the particular SOW:
      change the status of the particular SOW from the submitted status to an approved status,
      prevent changes from being made to the plurality set of documents of the particular SOW and additional documents from being added to the particular SOW set of documents, and
      generate and transmit an approval notification to a plurality of users in a logical group of the particular SOW;
   in response to a user request to recall the particular SOW in the approved status, from the plurality of SOWs, wherein the user request is from a user with a role required to approve the particular SOW:
      change the status of the particular SOW from the approved status to an unapproved status, and
      generate and transmit a recall notification to the plurality of users in the logical group of the particular SOW, wherein the recall notification indicates that the particular SOW is ready to be reapproved.

19. The computer-implemented method as recited in claim 18, wherein the required approval role for the particular SOW template is determined by one or more of a type of the particular SOW template, a logical group of the particular SOW template, or by a user selection of the required approval role via the user interface.

* * * * *